United States Patent
Peng et al.

(10) Patent No.: US 12,339,321 B2
(45) Date of Patent: Jun. 24, 2025

(54) SEMICONDUCTOR DEVICE AND METHOD OF FAILURE ANALYSIS FOR SEMICONDUCTOR DEVICE

(71) Applicant: TAIWAN SEMICONDUCTOR MANUFACTURING COMPANY, LTD., Hsinchu (TW)

(72) Inventors: Shih-Wei Peng, Hsinchu (TW); Wei-Cheng Lin, Hsinchu (TW); Jiann-Tyng Tzeng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 545 days.

(21) Appl. No.: 17/857,556

(22) Filed: Jul. 5, 2022

(65) Prior Publication Data
US 2023/0243888 A1 Aug. 3, 2023

Related U.S. Application Data

(60) Provisional application No. 63/267,390, filed on Feb. 1, 2022.

(51) Int. Cl.
| | | |
|---|---|---|
| *G01R 31/3185* | (2006.01) | |
| *G01R 31/307* | (2006.01) | |
| *G01R 31/317* | (2006.01) | |
| *G06F 30/396* | (2020.01) | |
| *G06F 30/398* | (2020.01) | |

(Continued)

(52) U.S. Cl.
CPC ... *G01R 31/318525* (2013.01); *G01R 31/307* (2013.01); *G01R 31/31717* (2013.01); *G06F 30/396* (2020.01); *G06F 30/398* (2020.01); *H01L 23/5226* (2013.01); *H01L 23/5283* (2013.01); *H01L 23/5286* (2013.01); *G06F 2117/10* (2020.01); *G06F 2119/12* (2020.01)

(58) Field of Classification Search
CPC .......... G01R 31/318525; G01R 31/307; G01R 31/31717; G06F 30/398; G06F 30/396; G06F 2117/10; G06F 2119/12; H01L 23/5226; H01L 23/5283; H01L 23/5286
USPC .......................................................... 257/48
See application file for complete search history.

(56) References Cited

U.S. PATENT DOCUMENTS

| | | | |
|---|---|---|---|
| 12,142,657 B2 * | 11/2024 | Yu | ........................ H10D 62/118 |
| 2019/0035934 A1 | 1/2019 | Chung et al. | |
| 2021/0091081 A1 | 3/2021 | Shin et al. | |

FOREIGN PATENT DOCUMENTS

| | | |
|---|---|---|
| TW | 202137401 | 10/2021 |
| TW | 202147554 | 12/2021 |

* cited by examiner

*Primary Examiner* — Tu-Tu V Ho
(74) *Attorney, Agent, or Firm* — Hauptman Ham, LLP

(57) ABSTRACT

The present disclosure provides a semiconductor device. The semiconductor device includes: a first cell, a dielectric layer, and a snorkel structure. The first cell has an output terminal. The dielectric layer is disposed on the first cell. The snorkel structure is disposed in the dielectric layer. The snorkel structure includes a first conductive structure, a first conductive layer, and a second conductive structure. The first conductive layer is electrically connected to the output terminal of the cell. The first conductive layer is disposed on and electrically connected to the first conductive structure. The second conductive structure is disposed on and electrically connected to the first conductive layer. The second conductive structure has a topmost conductive layer buried in the dielectric layer.

20 Claims, 22 Drawing Sheets

(51) Int. Cl.
*H01L 23/522* (2006.01)
*H01L 23/528* (2006.01)
*G06F 117/10* (2020.01)
*G06F 119/12* (2020.01)

SEMICONDUCTOR DEVICE AND METHOD OF FAILURE ANALYSIS FOR SEMICONDUCTOR DEVICE

PRIORITY CLAIM AND CROSS-REFERENCE

This application claims priority over U.S. Provisional Application No. 63/267,390 filed Feb. 1, 2022, the disclosure of which is hereby incorporated by reference in its entirety.

TECHNICAL FIELD

The disclosure relates to a semiconductor device and a method of failure analysis for a semiconductor device.

BACKGROUND

Failure Analysis (FA) is widely used in the semiconductor industry, and can detect defects in semiconductor devices, such as integrated circuits (ICs). However, as the design of semiconductor devices becomes more complex, the accuracy of detecting defects in semiconductor devices worsens.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
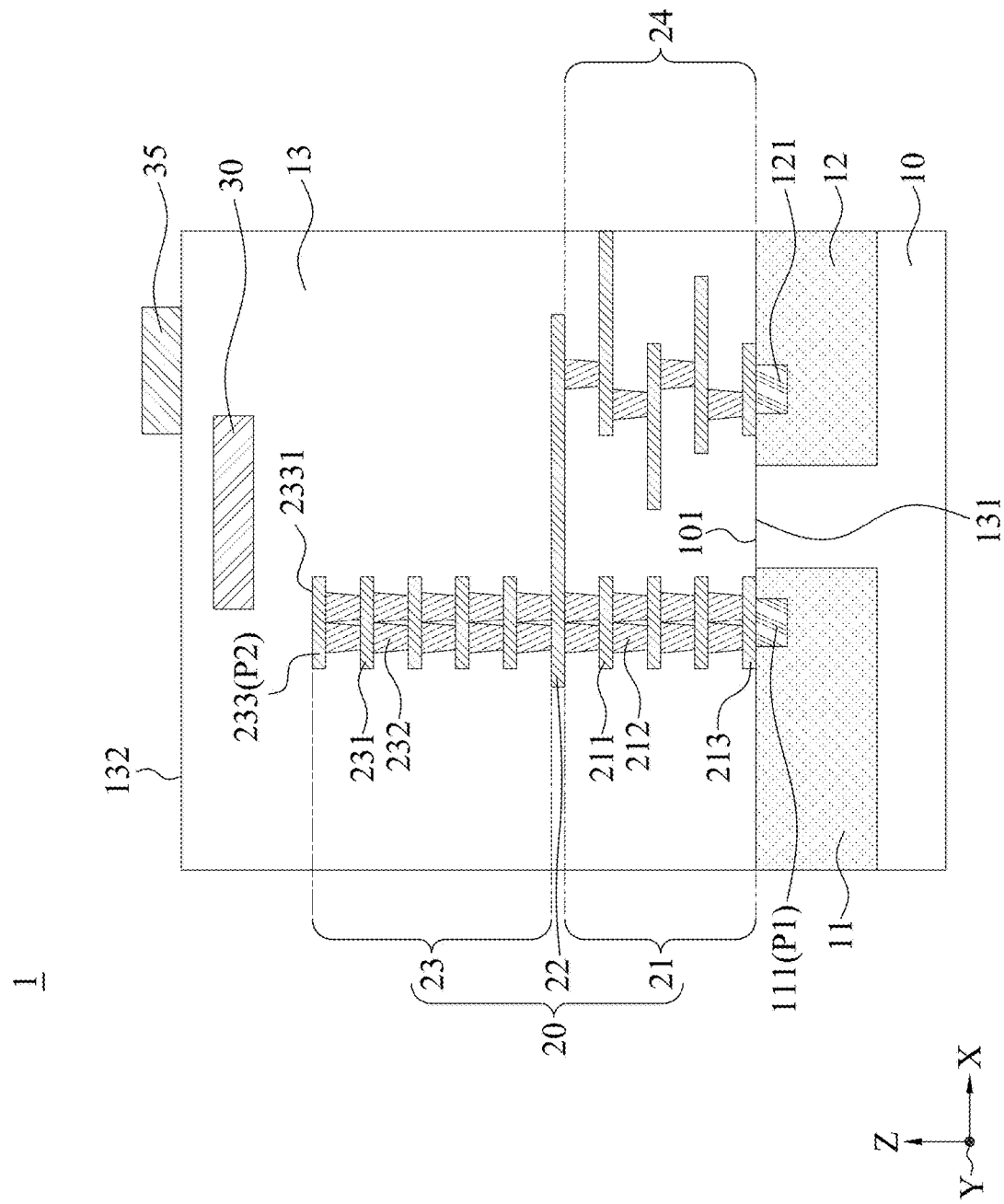
FIG. 1 is a cross-sectional view of a semiconductor device in accordance with some embodiments of the present disclosure.

The following disclosure provides many different embodiments, or examples, for implementing different features of the provided subject matter. Specific examples of components and arrangements are as follows to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, the following description should be understood to represent examples only, and are not intended to suggest that one or more steps or features is required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a cross-sectional view of a semiconductor device 1 in accordance with some embodiments of the present disclosure. The semiconductor device 1 includes a substrate 10, a cell 11, a cell 12, a dielectric layer 13, a snorkel structure 20, a conductive layer 30, and a conductive pad 35.

The substrate 10 has a surface 101. The substrate 10 is a semiconductor substrate, such as a bulk semiconductor substrate, a semiconductor-on-insulator (SOI) substrate, or the like, which may be doped (e.g., with a p-type or an n-type dopant) or undoped. The substrate 10 may be a semiconductor wafer, such as a silicon wafer. Generally, an SOI substrate includes a layer of a semiconductor material (e.g., silicon) formed on an insulator layer. The insulator layer may be, for example, a buried oxide (BOX) layer, a silicon oxide layer, or the like. The insulator layer is provided on a substrate, typically a silicon or glass substrate. Other substrates, such as a multi-layered or gradient substrate may also be used. In some embodiments, the semiconductor material of the substrate 10 includes silicon; germanium; a compound semiconductor including silicon carbide (SiC), gallium arsenic (GaAs), gallium phosphide (GaP), indium phosphide (InP), indium arsenide (InAs), and/or indium antimonide (InSb); an alloy semiconductor including SiGe, GaAsP, AlInAs, AlGaAs, GaInAs, GaInP, and/or GaInAsP; or combinations thereof.

Depending on the design requirements, the substrate 10 may be a p-type substrate, an n-type substrate or a combination thereof and may have doped regions therein. The substrate 10 may be configured for an NMOS device, a PMOS device, an n-type FinFET device, a p-type FinFET device, other kinds of devices (such as, multiple-gate transistors, gate-all-around transistors or nanowire transistors) or combinations thereof. In some embodiments, the substrate 10 for an NMOS device or an n-type FinFET device includes Si, SiP, SiC, SiPC, InP, GaAs, AlAs, InAs, InAlAs, InGaAs or combinations thereof. In some embodiments, the substrate 10 for a PMOS device or a p-type FinFET device includes Si, SiGe, SiGeB, Ge, InSb, GaSb, InGaSb or combinations thereof.

The cell 11 is disposed in the substrate 10. In some embodiments, the cell 11 is disposed in an active region of the substrate 10. In some embodiments, the cell 11 includes a circuit block, such as a scan flip-flop circuit and a latch. In some embodiments, the cell 11 includes an inverter, a buffer, AND, NAND, OR, XOR, and NOR, which are popular in digital circuit designs for applications, such as central processing unit (CPU), graphics processing unit (GPU), and system on chip (SOC) chip designs. The cell 11 includes an output terminal 111 configured to provide an output signal. In some embodiments, the output terminal 111 has a first potential P1 associated with the output signal. In some embodiments, the cell 11 may be configured to provide the output signal in response to an input signal from an external system. The output terminal 111 includes a conductive structure, such as a contact, a zero metal layer (M0), a first metal layer (M1), or an upper metal layer (e.g., M2~Mn).

The cell 12 is disposed in the substrate 10. The cell 12 is disposed adjacent to the cell 11. In some embodiments, the cell 12 is disposed in an active region of the substrate 10. In some embodiments, the cell 11 includes a circuit block, such as a scan flip-flop circuit and a latch. In some embodiments, the cell 12 includes an inverter, a buffer, AND, NAND, OR, XOR, and NOR, which are popular in digital circuit designs for applications, such as central processing unit (CPU), graphics processing unit (GPU), and system on chip (SOC) chip designs. The cell 12 includes an input terminal 121 configured to receive an output signal from other logic circuits (e.g., the cell 11). In some embodiments, the input terminal 121 includes a conductive structure, such as a contact, a zero metal layer (M0), a first metal layer (M1), or an upper metal layer (e.g., M2~Mn).

The dielectric layer 13 is disposed on the cell 11. The dielectric layer 13 is disposed on the cell 12. The dielectric layer 13 is disposed on the substrate 10, e.g., the surface 101. The dielectric layer 13 has a surface 131. The surface 131 of the dielectric layer 13 is in contact with the surface 101 of the substrate 10. The dielectric layer 13 has a surface 132 opposite to the surface 131 of the dielectric layer 13.

In some embodiments, the dielectric layer 13 includes one or more interlayer dielectric layers (ILDs). The dielectric layer 13 may be a single layer structure or a multi-layer structure. In some embodiments, the dielectric layer 13 includes silicon oxide, carbon-containing oxide such as silicon oxycarbide (SiOC), silicate glass, tetraethylorthosilicate (TEOS) oxide, un-doped silicate glass, or doped silicon oxide such as borophosphosilicate glass (BPSG), fluorine-doped silica glass (FSG), phosphosilicate glass (PSG), boron doped silicon glass (BSG), combinations thereof and/or other suitable dielectric materials. In some embodiments, the dielectric layer 13 includes low-k dielectric material with a dielectric constant lower than 4, or extreme low-k (ELK) dielectric material with a dielectric constant lower than 2.5. In some embodiments, the low-k material includes a polymer based material, such as benzocyclobutene (BCB); or a silicon dioxide based material, such as hydrogen silsesquioxane (HSQ) or SiOF.

The snorkel structure 20 is disposed on the substrate 10. The snorkel structure 20 is disposed in the dielectric layer 13. The snorkel structure 20 is disposed on the cell 11 and/or the cell 12. The snorkel structure 20 is disposed between the cell 11 and the cell 12. The snorkel structure 20 is buried in the dielectric layer 13. In some embodiments, the snorkel structure 20 may be completely covered by a portion of the dielectric layer 13. In some embodiments, the portion of the dielectric layer 13 includes one or more interlayer dielectric layers. The snorkel structure 20 is physically separated from any conductive element disposed thereon (e.g., the conductive layer 30 or the conductive pad 35).

The snorkel structure 20 may be electrically connected to the cell 11. In some embodiments, the snorkel structure 20 may be electrically connected to the output terminal 111 of the cell 11. The snorkel structure 20 may be electrically connected to the cell 12. In some embodiments, the snorkel structure 20 may be electrically connected to the input terminal 121 of the cell 12. The snorkel structure 20 may be electrically isolated from the conductive layer 30. The snorkel structure 20 may be electrically isolated from the conductive pad 35.

As shown in FIG. 1, the snorkel structure 20 includes a conductive structure 21, a conductive layer 22, a conductive structure 23, and a conductive structure 24.

The conductive structure 21 is disposed on the cell 11. In some embodiments, the conductive structure 21 is disposed on and electrically connected to the output terminal 111 of the cell 11. The conductive structure 21 can be referred to as "a via pillar" or "a via ladder." The conductive structure 21 includes a plurality of landing portions 211 and a plurality of conductive vias 212. One of the conductive vias 212 connects the first one of the landing portions 211 and the second one of the landing portions 211, which can be higher or lower than the first one of the landing portions 211. In this configuration, the landing portions and vias are in a "ladder"

or "elevator" configuration through one or more ILD layers of the dielectric layer 13. For example, the landing portions 211 vertically align, and conductive vias 212 vertically align.

The configuration shows that the landing portions 211 may have one landing portion at the same elevation in the cross-sectional view (e.g., in X-Z plane). Other configurations may have a number of landing portions in the X-Y plane parallel with each other. The number of landing portions 211 in the X-Y plane may be 2, 3, 4, or more.

The configuration shows that the conductive vias 212 may have two conductive vias at the same elevation in the cross-sectional view (e.g., in X-Z plane). Other configurations may have different numbers of conductive vias at the same elevation in the cross-sectional view, for example, 1, 3, 4, or more. This configuration also shows three full cycles of the landing portions 211 and the conductive vias 212. Other configurations may have different numbers of cycles.

The conductive structure 21 includes a conductive layer 213 connecting to the output terminal 111 of the cell 11 and/or the bottommost one of the conductive vias 212. The bottommost one of the conductive vias 212 refers to one of the conductive vias 212 which is nearest to the surface 101 of the substrate 10. In some embodiments, the conductive layer 213 may be referred to as a zero metal layer (M0) or a first metal layer (M1).

In some embodiments, the conductive structure 21 includes metal, such as tungsten (W), copper (Cu), Ru, Ir, Ni, Os, Rh, Al, Mo, Co, alloys thereof, combinations thereof or any metallic material with suitable resistance and gap-fill capability. In some embodiments, the landing portions 211, the conductive vias 212, and the conductive layer 213 include a barrier layer (not shown) and a conductor (not shown) on the barrier layer.

The conductive layer 22 is disposed on and electrically connected to the conductive structure 21. The conductive layer 22 connects to the topmost one of the conductive vias 212 of the conductive structure 21. The topmost one of the conductive vias 212 refers to one of the conductive vias 212 which is most remote from the surface 101 of the substrate 10. The conductive layer 22 extends in a first direction (e.g., the X direction). The conductive structure 21 or the conductive structure 23 substantially extends in a second direction (e.g., the Z direction). The first direction and the second direction are different. The first direction is substantially perpendicular to the second direction.

The conductive layer 22 is configured to transmit the output signal of the output terminal 111 of the cell 11 to the input terminal 121 of the cell 12. The conductive layer 22 may be referred to as a connection layer for the electrical signal transmission between the cell 11 and the cell 12. In some embodiments, the output terminal 111 of the cell 11 may be electrically connected to the input terminal 121 of the cell 12 through the conductive layer 22 of the snorkel structure 20. The conductive layer 22 has a first pitch, and the conductive structure 23 has a second pitch. The second pitch is greater than the first pitch. For example, the width of a conductive line of conductive structure 23 may be larger than the width of the conductive layer 22. The space between conductive lines of the conductive structure 23 may be larger than the space between the conductive layer 22 and another conductive layer at the same elevation. The conductive layer 22 may have a lower resistive-capacitive (RC) time constant than that of the conductive structure 23. The RC delay of the electrical transmission through the conductive layer 22 may be less than that through the conductive structure 23.

The configuration shows that the conductive layer 22 has a line pattern in the cross-sectional view (e.g., the X-Z plane). Other configuration may have a discontinuous pattern in the X-Z plane but a continuous pattern in the X-Y plane.

The material of the conductive layer 22 is similar to, and may be the same as or different from, that of the conductive structure 21. In some embodiments, the conductive layer 22 includes a barrier layer (not shown) and a conductor (not shown) on the barrier layer.

The conductive structure 24 is disposed on the cell 12. In some embodiments, the conductive structure 24 is disposed on and electrically connected to the input terminal 121 of the cell 12. The conductive layer 22 is disposed on and electrically connected to the conductive structure 24. The conductive structure 24 includes a plurality of patterned conductive layers and a plurality of conductive vias connecting at least two of the patterned conductive layers.

The material of the conductive structure 24 is similar to, and may be the same as or different from, that of the conductive structure 21. In some embodiments, the conductive structure 24 includes a barrier layer (not shown) and a conductor (not shown) on the barrier layer.

The conductive structure 23 is disposed on and electrically connected to the conductive layer 22. The conductive structure 23 can be referred to as "a via pillar" or "a via ladder." The conductive structure 23 includes a plurality of landing portions 231 and a plurality of conductive vias 232. One of the conductive vias 232 connects the first one of the landing portions 231 and the second one of the landing portions 231, which can be higher or lower than the first one of the landing portions 231. In this configuration, the landing portions and vias are in a "ladder" or "elevator" configuration through one or more ILD layers of the dielectric layer 13. For example, the landing portions 231 vertically align, and conductive vias 232 vertically align.

The configuration shows that the landing portions 231 may have one landing portion at the same elevation in the cross-sectional view (e.g., in X-Z plane). Other configurations may have a number of landing portions in the X-Y plane parallel with each other. The number of landing portions 231 in the X-Y plane may be 2, 3, 4, or more.

The configuration shows that the conductive vias 232 may have two conductive vias at the same elevation in the cross-sectional view (e.g., in X-Z plane). Other configurations may have different numbers of conductive vias at the same elevation in the cross-sectional view, for example, 1, 3, 4, or more. This configuration also shows three full cycles of the landing portions 231 and the conductive vias 232. Other configurations may have different numbers of cycles.

The bottommost one of the conductive vias 232 of the conductive structure 23 is connected to the conductive layer 22. The bottommost one of the conductive vias 232 refers to one of the conductive vias 232 which is nearest to the conductive layer 22

The conductive structure 23 includes a topmost conductive layer 233. The topmost conductive layer 233 means that it is the topmost portion of the snorkel structure 20, and, in other words, no conductive element of the snorkel structure 20 is disposed above and connects the topmost conductive layer 233. The topmost conductive layer 233 is buried by a portion of the dielectric layer 13. In some embodiments, the topmost conductive layer 233 may be completely covered by a portion of the dielectric layer 13. In some embodiments, the portion of the dielectric layer 13 includes one or more interlayer dielectric layers. The topmost conductive layer 233 has a surface 2331 facing away from the cell 11 and covered by a portion of the dielectric layer 13. The surface 2331 of the topmost conductive layer 233 may be referred to as the topmost surface of the snorkel structure 20. The topmost conductive layer 233 is physically separated from the conductive layer 30 or the conductive pad 35. The topmost conductive layer 233 may be electrically isolated from the conductive layer 30. The topmost conductive layer 233 may be electrically isolated from the conductive pad 35.

The topmost conductive layer 233 of the conductive structure 23 of the snorkel structure 20 may be electrically connected to the cell 11. In some embodiments, the topmost conductive layer 233 may be electrically connected to the output terminal 111 of the cell 11. In some embodiments, the topmost conductive layer 233 has a second potential P2 associated with the output signal of the output terminal 111 of the cell 11. The first potential P1 of the output terminal 111 of the cell 11 and the second potential P2 of the topmost conductive layer 233 may be substantially the same. In other words, the output signal (e.g., an electrical signal, such as a voltage or current) of the output terminal 111 of the cell 11 is transmitted to the topmost conductive layer 233 through the conductive structure 21, the conductive layer 22, and the conductive structure 23 of the snorkel structure 20 in a direction (e.g., the Z direction) perpendicular to the surface 131/132 of the dielectric layer 13. In some embodiments, the output signal of the output terminal 111 of the cell 11 is transmitted to the topmost conductive layer 233 through the conductive structure 21, the conductive layer 22, and the conductive structure 23 of the snorkel structure 20 in a direction (e.g., the Z direction) perpendicular to a surface of the cell 11 which faces the snorkel structure 20.

In some embodiments, the conductive structure 23 includes metal, such as tungsten (W), copper (Cu), Ru, Ir, Ni, Os, Rh, Al, Mo, Co, alloys thereof, combinations thereof or any metallic material with suitable resistance and gap-fill capability. In some embodiments, the landing portions 231, the conductive vias 232, and the topmost conductive layer 233 includes a barrier layer (not shown) and a conductor (not shown) on the barrier layer.

The conductive layer 30 is disposed in the dielectric layer 13. The conductive layer 30 is disposed adjacent to the surface 132 of the dielectric layer 13. The conductive layer 30 is disposed over the snorkel structure 20. As shown in FIG. 1, the conductive layer 30 may not be connected to other conductive structures in the X-Z plane, while the conductive layer 30 may be connected to other conductive structures in the Y-X plane. In some embodiments, the conductive layer 30 includes metal, such as tungsten (W), copper (Cu), Ru, Ir, Ni, Os, Rh, Al, Mo, Co, alloys thereof, combinations thereof or any metallic material with suitable resistance and gap-fill capability. In some embodiments, the conductive layer 30 includes a barrier layer (not shown) and a conductor (not shown) on the barrier layer.

The conductive pad 35 is disposed on the surface 132 of the dielectric layer 13. The conductive pad 35 is disposed over the conductive layer 30. As shown in FIG. 1, the conductive pad 35 may be used for connecting to an external system. In some embodiments, the conductive pad 35 includes metal, such as tungsten (W), copper (Cu), Ru, Ir, Ni, Os, Rh, Al, Mo, Co, alloys thereof, combinations thereof or any metallic material with suitable resistance and gap-fill capability. In some embodiments, the conductive pad 35 includes a barrier layer (not shown) and a conductor (not shown) on the barrier layer.

Figure 2:
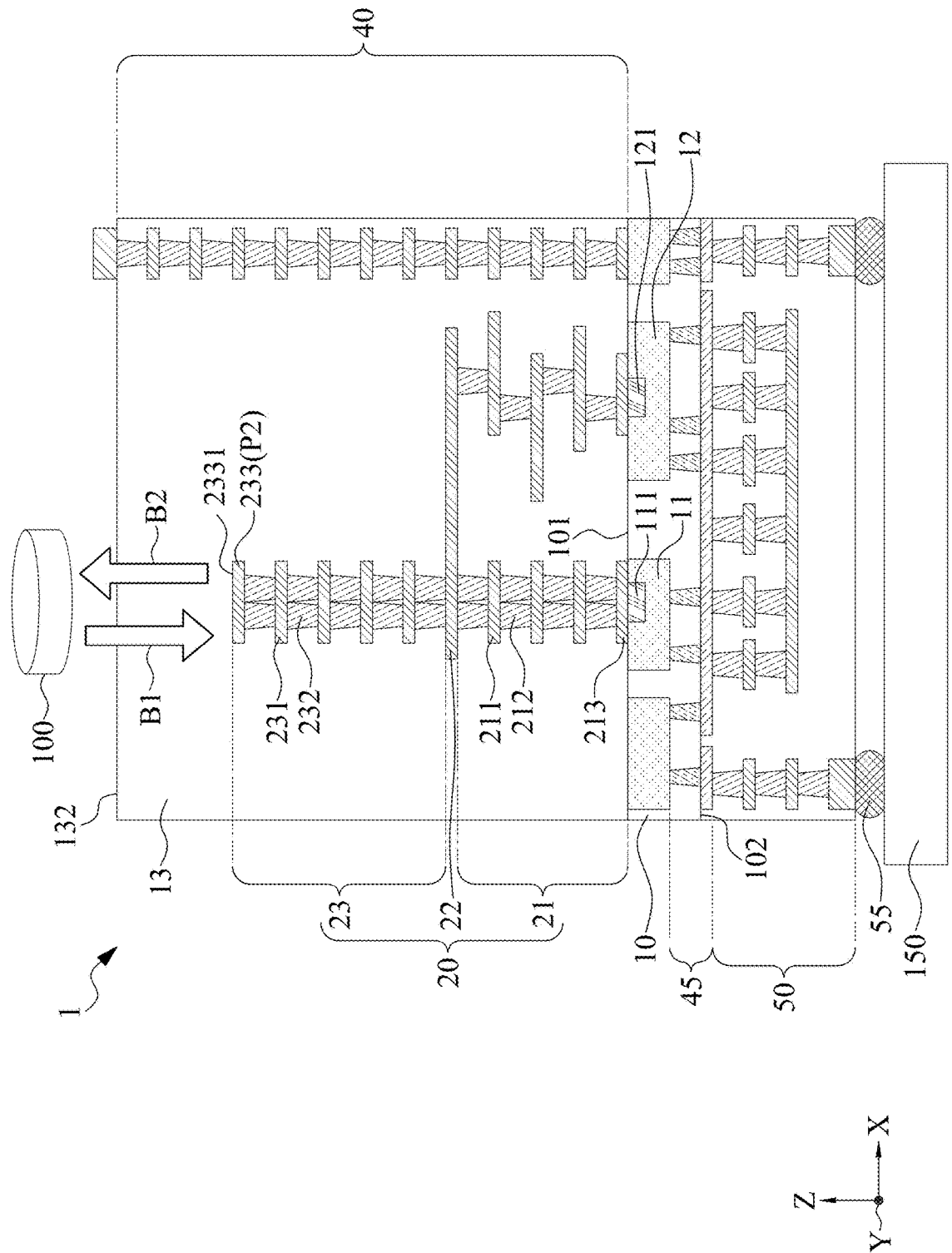
FIG. 2 is a cross-sectional view of a semiconductor device tested by a detector and a tester in accordance with some embodiments of the present disclosure.

FIG. 2 is a cross-sectional view of the semiconductor device 1 tested by a detector 100 and a tester 150 in accordance with some embodiments of the present disclosure.

As shown in FIG. 2, the semiconductor device 1 further includes a conductive structure 40, a backside conductive structure 45, a backside power delivery network 50, and a plurality of electrical connections 55.

The conductive structure 40 may be electrically connected to a cell of the semiconductor device 1. The conductive structure 40 includes a plurality of patterned conductive layers and a plurality of conductive vias connecting two of the patterned conductive layers. The material of the conductive structure 40 is similar to, and may be the same as or different from, that of the conductive structure 21. In some embodiments, the conductive structure 40 includes a barrier layer (not shown) and a conductor (not shown) on the barrier layer.

The backside conductive structure 45 may be electrically connected to one or more cells of the semiconductor device 1 (e.g., the cell 11 and/or the cell 12). The backside conductive structure 45 includes a plurality of patterned conductive layers and a plurality of conductive vias connecting two of the patterned conductive layers. In some embodiments, the backside conductive structure 45 is disposed adjacent to a surface 102 of the substrate 10. The surface 102 of the substrate 10 is opposite to the surface 101 of the substrate 10.

The material of the backside conductive structure 45 is similar to, and may be the same as or different from, that of the conductive structure 21. In some embodiments, the backside conductive structure 45 includes a barrier layer (not shown) and a conductor (not shown) on the barrier layer.

The backside power delivery network 50 is disposed on the surface 102 of the substrate 10. The backside power delivery network 50 is electrically connected to one or more cells of the substrate 10 (e.g., the cell 11 and/or the cell 12) through the backside conductive structure 45. The backside power delivery network 50 may be configured to provide power to one or more cells of the semiconductor device 1 (e.g., the cell 11 and/or the cell 12). The backside power delivery network 50 may be configured to deliver data signals to one or more cells of the semiconductor device 1 (e.g., the cell 11 and/or the cell 12). The backside power delivery network 50 may be configured to deliver an input signal from an external system (e.g., the tester 150).

The material of the backside power delivery network 50 is similar to, and may be the same as or different from that of the conductive structure 21. In some embodiments, the backside power delivery network 50 includes a barrier layer (not shown) and a conductor (not shown) on the barrier layer.

The electrical connections 55 are disposed on the backside power delivery network 50. The electrical connections 55 are electrically connected to the backside power delivery network 50. The electrical connections 55 may be attached to the tester 150. The tester 150 may provide one or more electrical signals to the backside power delivery network 50 through the electrical connections 55. In some embodiments, the one or more electrical signals include power. In some embodiments, the one or more electrical signals include data signals. In some embodiments, the electrical connections 55 include, for example, a solder ball or a controlled collapse chip connection (C4) bump.

The detector 100 is configured to provide a first charged particle beam B1 to the snorkel structure 20, e.g., the topmost conductive layer 233 of the snorkel structure 20. The first charged particle beam B1 may have a beam size of 20*20 nm. The first charged particle beam B1 may pass through a portion of the dielectric layer 13. The topmost conductive layer 233 is configured to receive the first charged particle beam B1 and reflect the first charged particle beam B1 as a second charged particle beam B2 based on the second potential P2 of the topmost conductive layer 233. If the second potential P2 is high (e.g., a logic value of 1), the second charged particle beam B2 has a first energy. If the second potential P2 is low (e.g., a logic value of 0), the second charged particle beam B2 has a second energy. The first energy and the second energy are different.

In some embodiments, each of the first charged particle beam B1 and the second charged particle beam B2 includes an electron beam. A portion of the first charged particle beam B1 may be absorbed by the portion of the dielectric layer 13. The first charged particle beam B1 has energy sufficient to pass through the portion of the dielectric layer 13, which is on the topmost conductive layer 233. A portion of the second charged particle beam B2 may be absorbed by the portion of the dielectric layer 13. The second charged particle beam B2 has energy sufficient to pass through the portion of the dielectric layer 13, which is on the topmost conductive layer 233.

The detector 100 may be configured to receive the second charged particle beam B2. Based on the energy of the second charged particle beam B2, the detector 100 can calculate the second potential P2 of the topmost conductive layer 233 of the snorkel structure 20. Since the second potential P2 is associated with the output signal of the output terminal 111 of the cell 11, the detector 100 is able to acquire the output signal of the output terminal 111 of the cell 11, which is adjacent to the substrate 10. The snorkel structure 20 transmits the output signal of the output terminal 111 of the cell 11 to the topmost conductive layer 233 of the snorkel structure 20, which is closer to the surface 132 of the dielectric layer 13. The relatively elevated location of the topmost conductive layer 233 makes the charged-particle-beam based detection feasible. The detector 100 can acquire the output signal of the output terminal 111 of the cell 11 based on the first charged particle beam B1 and the second charged particle beam B2, without making direct contact with the output terminal of the cell 11.

Furthermore, the tester 150 may be configured to provide a testing signal (e.g., a charged particle beam) to the backside of the semiconductor device 1. However, the backside power delivery network 50 may severely interfere the testing signal. As such, the testing signal is unable to arrive at the output terminal 111 of the cell 11. In the present disclosure, the snorkel structure 20 transmits the output signal of the output terminal 111 of the cell 11 to the topmost conductive layer 233. Therefore, a detector (e.g., the detector 100) can acquire the output signal by providing the first charged particle beam B1 and receiving the second charged particle beam B2 from the topmost conductive layer 233 through the front-side of the semiconductor device 1.

In some embodiments, the snorkel structure 20 may exclude the conductive structure 23. As such, the detector 100 may be configured to provide a charged particle beam to the conductive layer 22 and receive another charged particle beam from the conductive layer 22. The detector 100 may be configured to calculate the potential of the conductive layer 22 based on these charged particle beams. The charged particle beam would have relatively high energy sufficient to pass through a large chunk of the dielectric layer 13, as such these embodiments can be manifested.

In some embodiment, the snorkel structure 20 may further include upper conductive layers at the same elevation of the conductive layer 30 or the conductive pad 35 as shown in FIG. 1. Nevertheless, the RC delay caused by the additional upper conductive layers may be relatively large and may significantly influence the timing of the semiconductor device 1.

Figure 3:
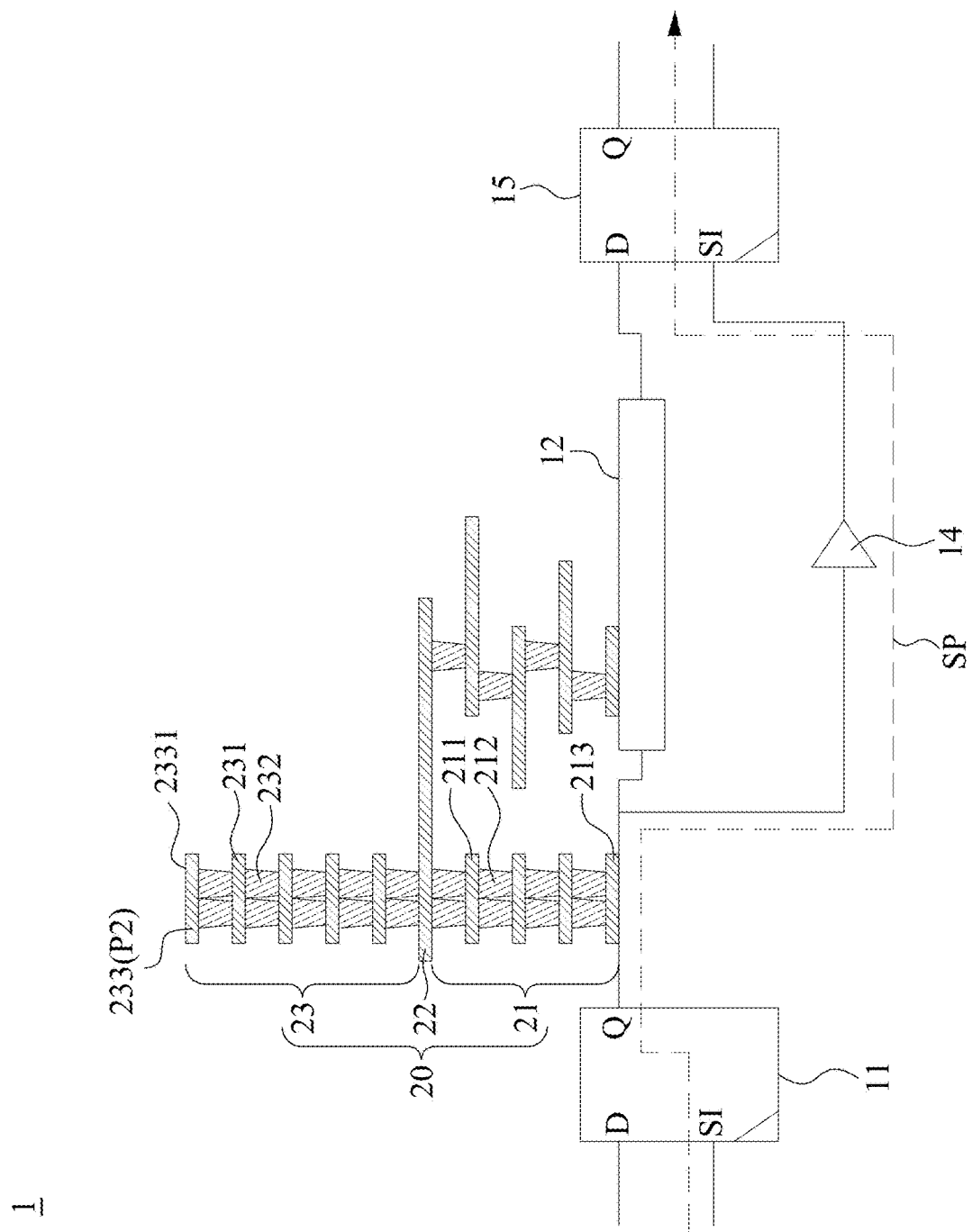
FIG. 3 is a block diagram of a semiconductor device in accordance with some embodiments of the present disclosure.

FIG. 3 is a block diagram of the semiconductor device 1 in accordance with some embodiments of the present disclosure. As shown in FIG. 3, the cell 11 is a scan flip-flop circuit and the cell 12 is an integrated circuit including a plurality of logic gates (not shown). In some embodiments, the scan flip-flop circuit 11 includes a muxed input master-slave based D flip-flop.

The semiconductor device 1 further includes a buffer 14 and a cell 15. The cell 15 can be a scan flip-flop circuit. In some embodiments, the scan flip-flop circuit 15 includes a muxed input master-slave based D flip-flop. The buffer 14 is electrically connected to the cell 15. The cell 12 is electrically connected to the cell 15.

In some embodiments, the scan flip-flop circuit 11, the cell 12, the buffer 14, and the scan flip-flop circuit 15 forms a scan chain. The scan chain has a scan in path SP is formed between an input terminal SI of the scan flip-flop circuit 11 and an output terminal Q of the scan flip-flop circuit 15, through the output terminal Q of the scan flip-flop circuit 11 and the input terminal SI of the scan flip-flop circuit 15. The buffer 14 is located in the scan in path SP.

In some embodiments, the scan in path SP is for testing the scan flip-flop circuit 11. The snorkel structure 20 is connected to the scan in path SP, such that the scan flip-flop circuit 11 can be detected by the detector 100 as illustrated in FIG. 2. The scan flip-flop circuit 11 has an input terminal SI receiving a test input signal and has an output terminal Q transmitting an output signal. The snorkel structure 20 is connected to an output terminal Q of the scan flip-flop circuit 11. The snorkel structure 20 can transmit the output signal from the output terminal Q of the scan flip-flop circuit 11 to the topmost conductive layer 233 of the snorkel structure 20. As such, a potential (e.g., the second potential P2) of the topmost conductive layer 233 is associated with the output signal of the output terminal Q of the scan flip-flop circuit 11. The detector 100 can detect the output signal of the output terminal Q of the scan flip-flop circuit 11 by transmitting the first charged particle beam B1 to the topmost conductive layer 233 and receiving the second charged particle beam B2 from the topmost conductive layer 233. Based on the difference between the first and second charged particle beams B1 and B2, the detector 100 can acquire the output signal of the output terminal Q of the scan flip-flop circuit 11 and then determine whether said output signal meets an expected value, which is associated with the test input signal.

If any failure of the scan flip-flop circuit 11 happens, the second potential P2 of the topmost conductive layer 233 of the snorkel structure 20 would be abnormal or have an outlying value. As such, the detector 100 will provide a warning to an engineer or an automatic system, and the engineer or the automatic system will disable the scan flip-flop circuit 11 and find an alternative for the semiconductor device 1 and/or will downgrade or abandon the semiconductor device 1. In other configurations, the cell 11 can include other logic gates, such as an inverter, a buffer, AND, NAND, OR, XOR, and NOR. The detector 100 as illustrated in FIG. 2 is able to detect the failure of the cell 11 through analyzing the charged particle beam provided by the snorkel structure 20.

Figure 3A:
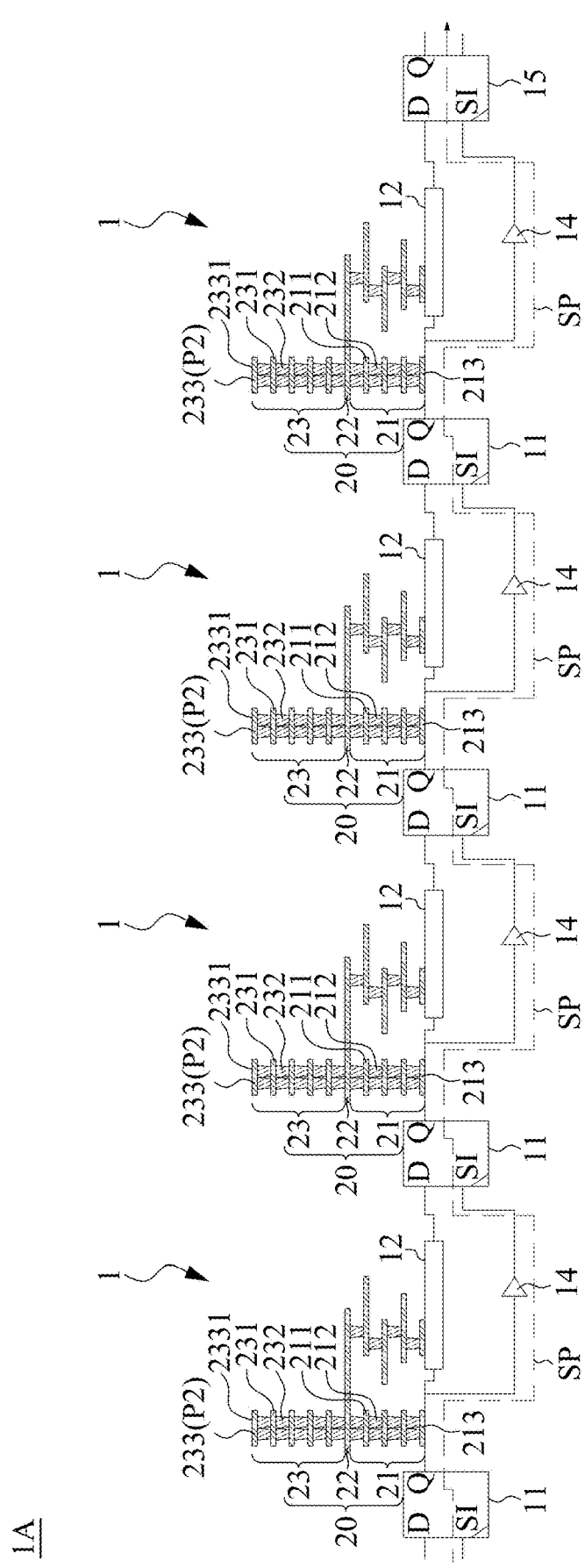
FIG. 3A is a block diagram of a semiconductor device in accordance with some embodiments of the present disclosure.

FIG. 3A is a block diagram of a semiconductor device 1A in accordance with some embodiments of the present disclosure. The semiconductor device 1A includes a plurality of semiconductor devices 1 as illustrated in FIG. 3. As shown in FIG. 3A, the semiconductor devices 1 may be connected in series, in which the cell 11 of a semiconductor device 1 is the cell 15 of the preceding semiconductor device 1. Each of the cells 11 (e.g., the scan flip-flop circuit) has an output terminal (e.g., the terminal Q) connected to the snorkel structure 20. The potential of each of the cells 11 of the semiconductor devices 1 can be detected by a detector (e.g., the detector 100 in FIG. 2) through the snorkel structure 20.

Figure 3B:
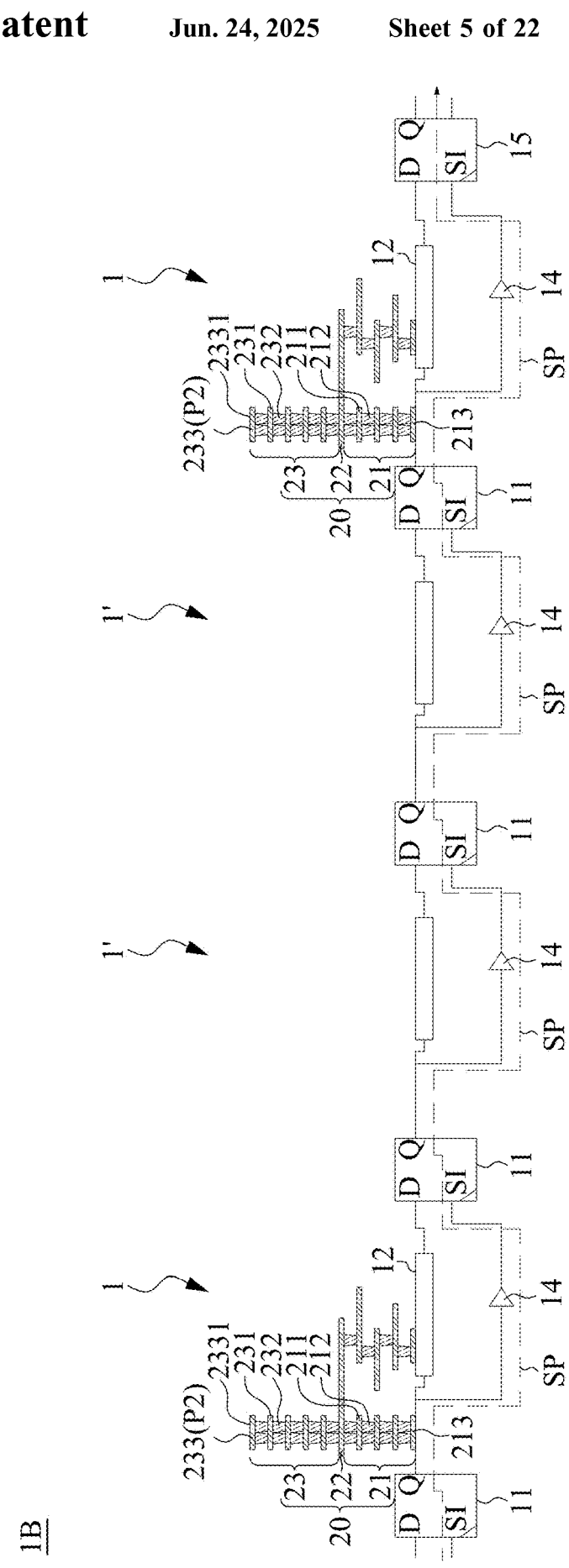
FIG. 3B is a block diagram of a semiconductor device in accordance with some embodiments of the present disclosure.

FIG. 3B is a block diagram of a semiconductor device 1B in accordance with some embodiments of the present disclosure. The semiconductor device 1B includes a plurality of semiconductor devices 1 as illustrated in FIG. 3. The semiconductor device 1B includes a plurality of semiconductor devices 1'. The semiconductor device 1' and the semiconductor device 1 differ in that the semiconductor device 1' lacks a snorkel structure. The semiconductor device 1 may be connected between two semiconductor devices 1'. Multiple semiconductor devices 1 may be connected between two semiconductor devices 1'. In some embodiments, the semiconductor device 1 may be inserted into a series of semiconductor devices 1', such that the cell 11 (e.g., the scan flip-flop circuit) may be detected. In other words, not all of the cells 11 are connected to a snorkel structure. As such, the RC delay induced by the snorkels structure(s) of the semiconductor device 1B will be less than that of the semiconductor device 1A.

Figure 4:
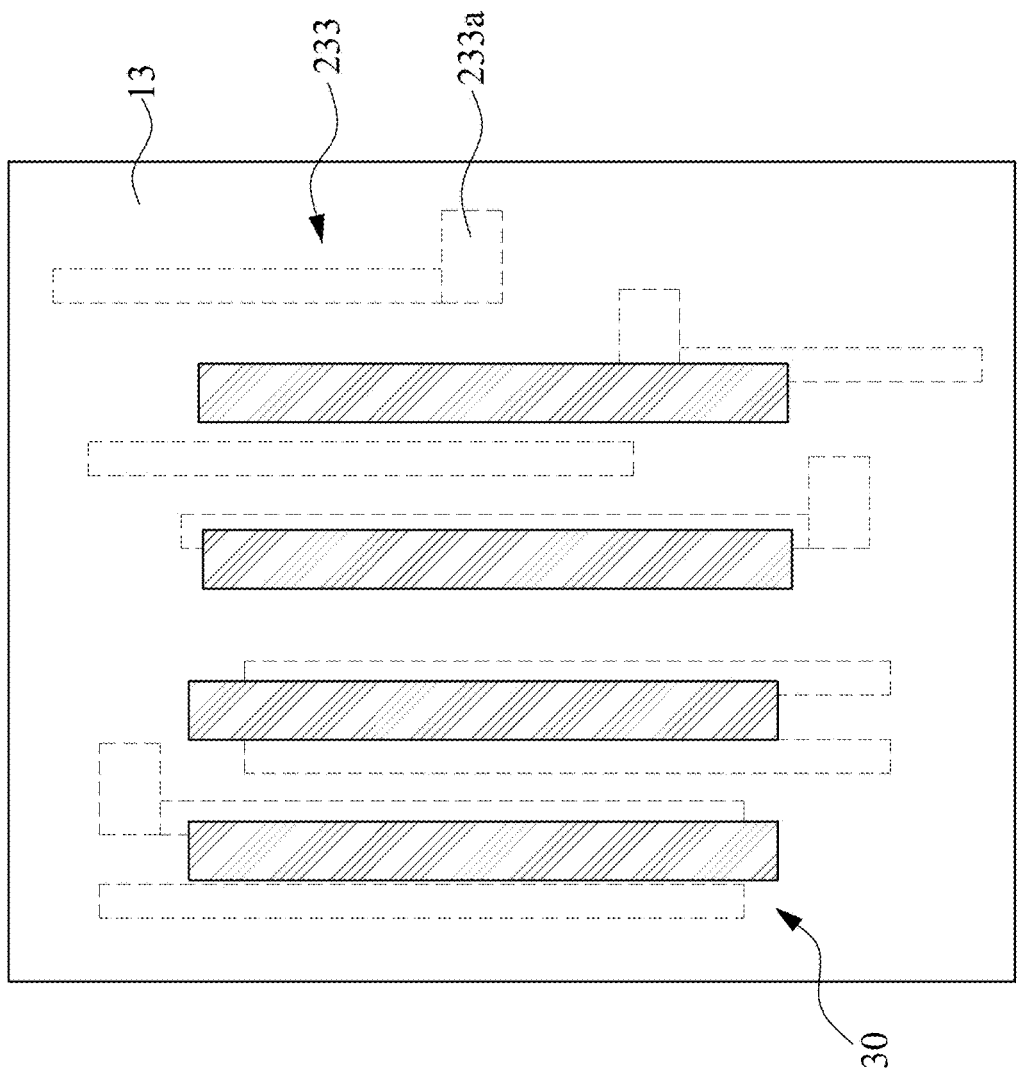
FIG. 4 is a top view of a semiconductor device in accordance with some embodiments of the present disclosure.

FIG. 4 is a top view of the semiconductor device 1 in accordance with some embodiments of the present disclosure. The dashed line of the topmost conductive layer 233 indicates that the conductive layer 233 is buried in the dielectric layer 13. The solid line of the conductive layer 30 indicates that it is higher than the topmost conductive layer 233 and will be visible if a portion of the dielectric layer 13 has been removed.

As shown in FIG. 4, a portion of the topmost conductive layer 233 is covered by the conductive layer 30, which will reduce the area of the topmost conductive layer 233 for receiving the first charged particle beam B1 as illustrated in FIG. 2. The receiving area may be increased by adding an enclosure 233a for the topmost conductive layer 233. The enclosure 233a may have a substantially rectangular shape from the top view. The ratio of the length and the width of the enclosure 233a may be about 1.5. For example, if the width of the enclosure 233a is 1 W, the length of the enclosure 233a will be 1.5 W. The enclosure 233a increases the effective receiving area for the first charged particle beam B1.

In some embodiments, the conductive layer 30 is free from completely covering the topmost conductive layer 233 of the conductive structure 23 of the snorkel structure 20 from the top view.

Figure 5:
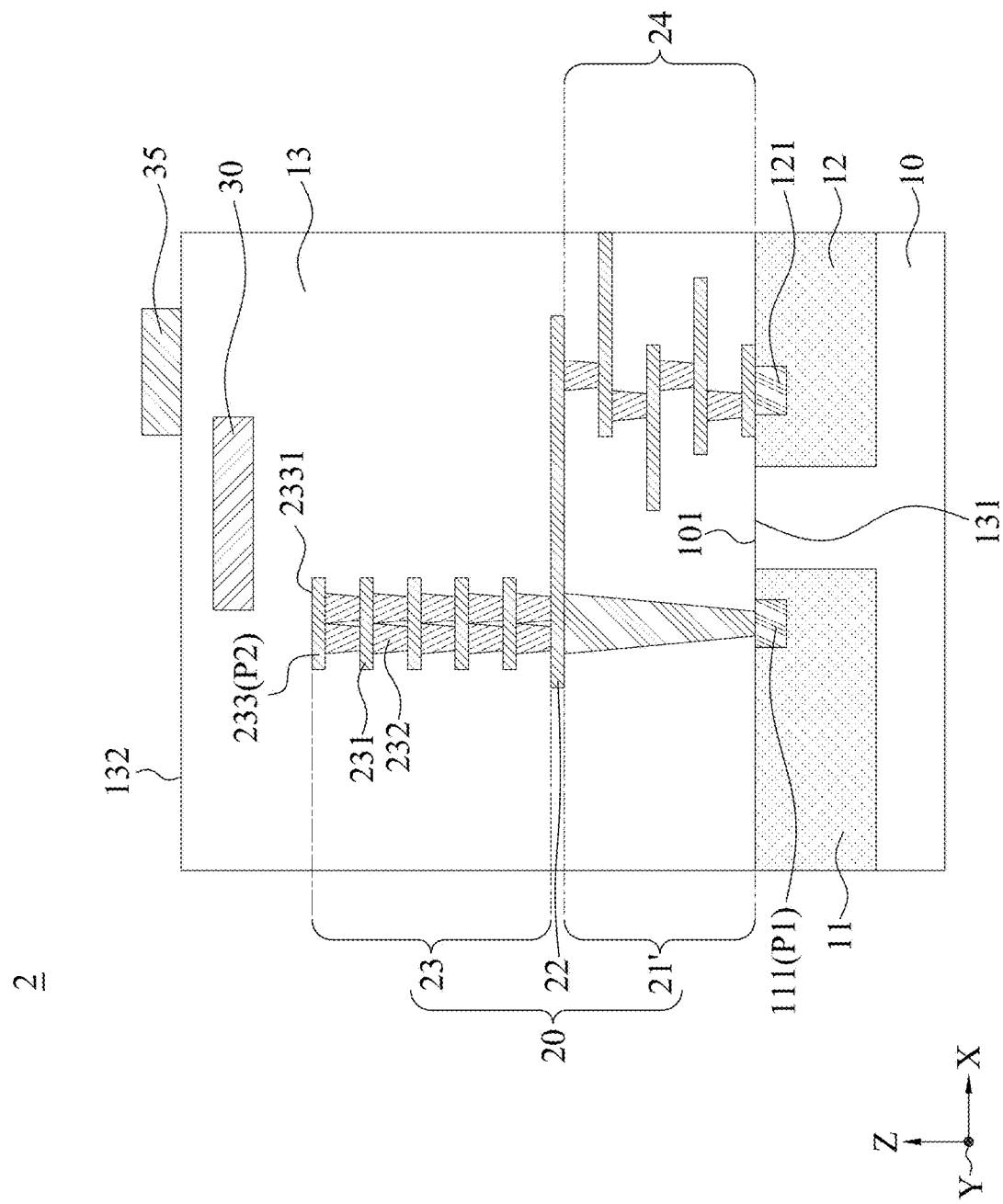
FIG. 5 is a cross-sectional view of a semiconductor device in accordance with some embodiments of the present disclosure.

FIG. 5 is a cross-sectional view of a semiconductor device 2 in accordance with some embodiments of the present disclosure. The semiconductor device 2 has a structure similar to that of the semiconductor device 1. One of the differences between the semiconductor devices 1 and 2 is that the snorkel structure 20 includes a through-silicon-via (TSV) 21', rather than the conductive structure 21 as illustrated in FIG. 1. The TSV 21' is disposed on the output terminal 111 of the cell 11. The TSV 21' may be electrically connected to the output terminal 111 of the cell 11. The TSV 21' may be electrically connected to the conductive layer 22.

In some embodiments, the TSV 21' includes metal, such as tungsten (W), copper (Cu), Ru, Ir, Ni, Os, Rh, Al, Mo, Co, alloys thereof, combinations thereof or any metallic material with suitable resistance and gap-fill capability.

Figure 6:
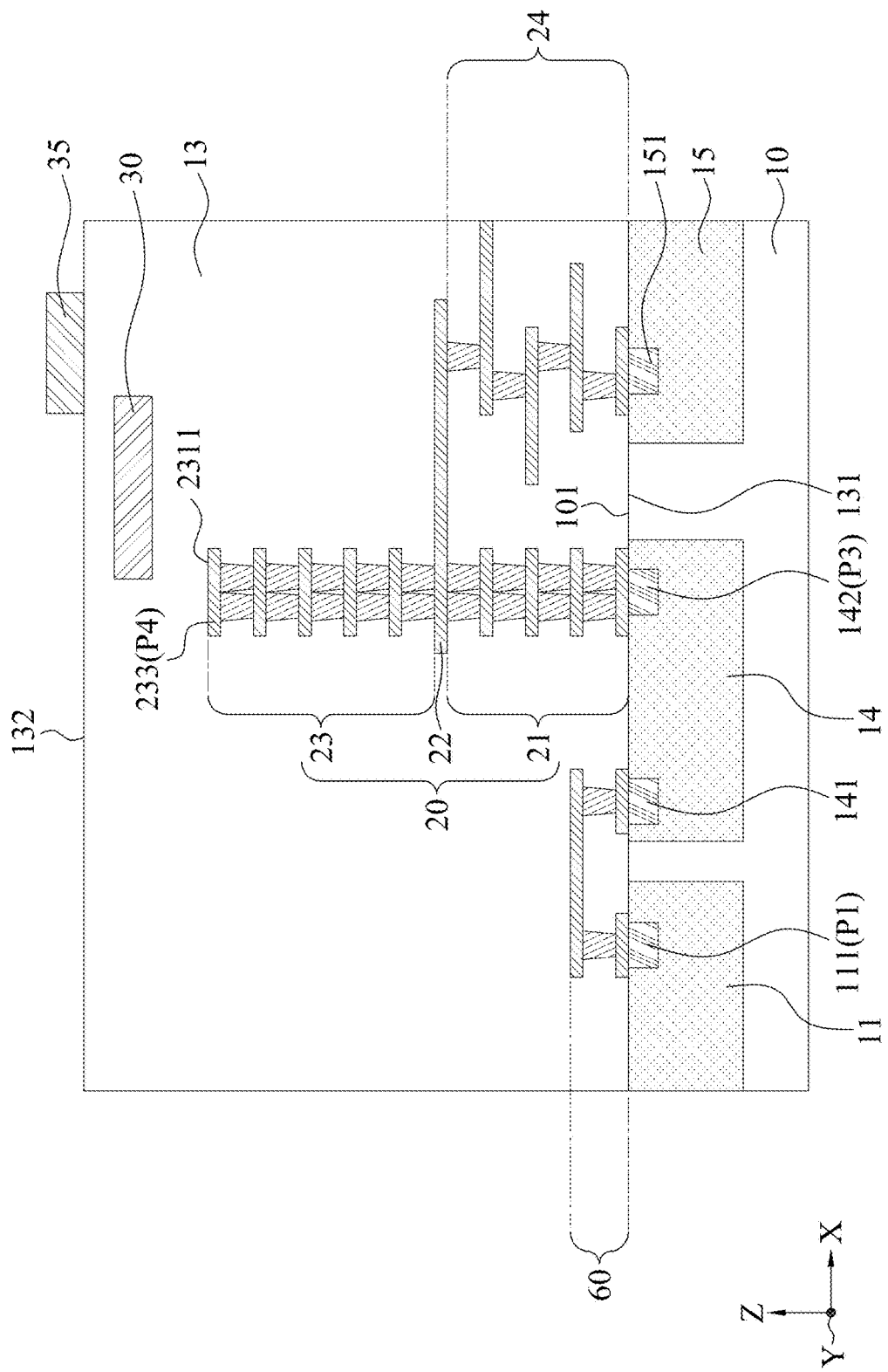
FIG. 6 is a cross-sectional view of a semiconductor device in accordance with some embodiments of the present disclosure.

FIG. 6 is a cross-sectional view of a semiconductor device 3 in accordance with some embodiments of the present disclosure. The semiconductor device 3 has a structure similar to that of the semiconductor device 1. One of the differences between the semiconductor devices 1 and 3 is that the semiconductor device 3 further includes a cell 14 and a cell 15.

The cell 14 is disposed in the substrate 10. The cell 14 is disposed adjacent to the cell 11. In some embodiments, the cell 14 is disposed in an active region of the substrate 10. In some embodiments, the cell 14 includes a circuit block, such as a scan flip-flop circuit and a latch. In some embodiments, the cell 14 includes an inverter, a buffer, AND, NAND, OR, XOR, and NOR, which are popular in digital circuit designs for applications, such as central processing unit (CPU), graphics processing unit (GPU), and system on chip (SOC) chip designs.

The cell 15 is disposed in the substrate 10. The cell 15 is disposed adjacent to the cell 14. In some embodiments, the cell 15 is disposed in an active region of the substrate 10. In some embodiments, the cell 15 includes a circuit block, such as a scan flip-flop circuit and a latch. In some embodiments, the cell 15 includes an inverter, a buffer, AND, NAND, OR, XOR, and NOR, which are popular in digital circuit designs for applications, such as central processing unit (CPU), graphics processing unit (GPU), and system on chip (SOC) chip designs.

The cell 14 includes a first terminal 141 (or an input terminal) and a second terminal 142 (or an output terminal). The first terminal 141 and the second terminal 142 may each include a conductive structure, such as a contact, a zero metal layer (M0), a first metal layer (M1), or an upper metal layer (e.g., M2~Mn).

The cell 14 is electrically connected to the cell 11. The semiconductor device 3 includes a conductive structure 60 for electrically connecting the cell 11 and the cell 14. The conductive structure 60 electrically connects the output terminal 111 of the cell 11 to the first terminal 141 of the cell 14. The conductive structure 60 includes a plurality of patterned conductive layers and a plurality of conductive vias connecting two of the patterned conductive layers. The material of the conductive structure 60 is similar to, and may be the same as or different from, that of the conductive structure 21. In some embodiments, the conductive structure 60 includes a barrier layer (not shown) and a conductor (not shown) on the barrier layer.

The first terminal 141 of the cell 14 is configured to receive the output signal of the output terminal 111 of the cell 11. The cell 14 is configured to provide a second output signal by the second terminal 142 of the cell 14, in response to the output signal. In some embodiments, the output signal and the second output signal are substantially the same. The second terminal 142 has a third potential P3 associated with the second output signal. Furthermore, the third potential P3 is associated with the output signal of the output terminal 111 of the cell 11. In some embodiments, the first potential P1 of the output terminal 111 of the cell 11 and the third potential P3 of the second terminal 142 of the cell 14 are substantially the same.

The cell 14 is electrically connected to the cell 15. The cell 14 is electrically connected to the cell 15 through the snorkel structure 20. In some embodiments, the conductive structure 24 of the snorkel structure 20 is disposed on and electrically connected to an input terminal 151 of the cell 15.

The topmost conductive layer 233 of the conductive structure 23 of the snorkel structure 20 may be electrically connected to the cell 14. In some embodiments, the topmost conductive layer 233 may be electrically connected to the second terminal 142 of the cell 14. In some embodiments, the topmost conductive layer 233 has a fourth potential P4 associated with the second output signal of the second terminal 142 of the cell 14.

The third potential P3 of the second terminal 142 of the cell 14 and the fourth potential P4 of topmost conductive layer 233 may be substantially the same. In other words, the second output signal (e.g., an electrical signal, such as a voltage or current) of the second terminal 142 of the cell 14 is transmitted to the topmost conductive layer 233 through the conductive structure 21, the conductive layer 22, and the conductive structure 23 of the snorkel structure 20 in a direction perpendicular to the surface 131/132 of the dielectric layer 13 (e.g., the Z direction).

The semiconductor device 3 can be tested by the detector 100 and the tester 150 as illustrated in FIG. 2. For example, the topmost conductive layer 233 is configured to receive a first charged particle beam B1 and provide a second charged particle beam B2 in response to the first charged particle beam B1 based on the fourth potential P4 of the topmost conductive layer 233. If the fourth potential P4 is high (e.g., a logic value of 1), the second charged particle beam B2 has a third energy. If the fourth potential is low (e.g., a logic value of 0), the second charged particle beam B2 has a fourth energy. The third energy and the fourth energy are different.

The snorkel structure 20 transmits the second output signal of the second terminal 142 of the cell 14 to the topmost conductive layer 233 of the snorkel structure 20, which is closer to the surface 132 of the dielectric layer 13. The relatively elevated location of the topmost conductive layer 233 makes the charged-particle-beam based detection feasible. The detector 100 can acquire the second output signal of the second terminal 142 of the cell 14 based on the first charged particle beam B1 and the second charged particle beam B2, without directly detecting the second terminal 142 of the cell 14.

Figure 7:
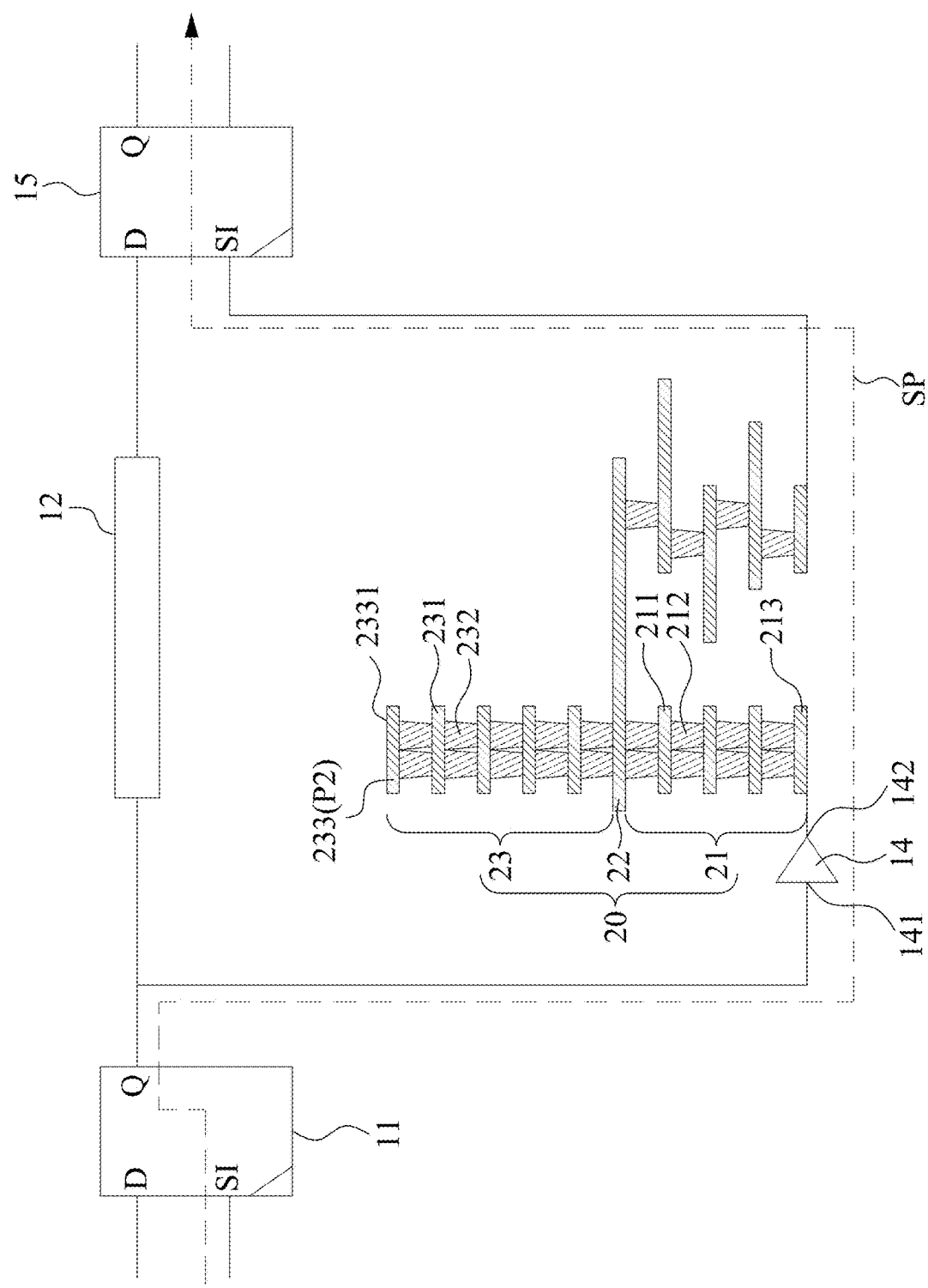
FIG. 7 is a block diagram of a semiconductor device in accordance with some embodiments of the present disclosure.

FIG. 7 is a block diagram of the semiconductor device 3 in accordance with some embodiments of the present disclosure. As shown in FIG. 7, the cell 11 is a scan flip-flop circuit, the cell 14 is a buffer, and the cell 15 is a scan flip-flop circuit.

A scan in path SP is formed between an input terminal SI of the scan flip-flop circuit 11 and an output terminal Q of the scan flip-flop circuit 15, through an output terminal Q of the scan flip-flop circuit 11 and an input terminal SI of the scan flip-flop circuit 15. The buffer 14 is located in the scan in path SP. The snorkel structure 20 is connected to the output terminal of the buffer 14 (e.g., the second terminal 142 as shown in FIG. 6), such that the buffer 14 can be detected by the detector 100 as illustrated in FIG. 2. Connecting the snorkel structure 20 to the second terminal 142 of the buffer 14 can reduce the RC delay. The buffer 14 may buffer the output signal of the output terminal 111 of the scan flip-flop circuit 11 and provide the second output signal on the second terminal 142 of the buffer 14. The second output signal of the second terminal 142 of the buffer 14 is correlated with the output signal of the output terminal of the scan flip-flop circuit 11. Furthermore, the first potential P1 of the output terminal 111 of the scan flip-flop circuit 11 is associated with the third potential P3 of the second terminal 142, which is further associated with the fourth potential P4. If any failure of the scan flip-flop circuit 11 happens, the fourth potential P4 of the topmost conductive layer 233 of the snorkel structure 20 would be abnormal or have an outlying value. As such, the detector 100 will provide a warning to an engineer or an automatic system, and the engineer or the automatic system will disable the scan flip-flop circuit 11 and find an alternative for the semiconductor device 3, or will downgrade or abandon the semiconductor device 3.

Figure 7A:
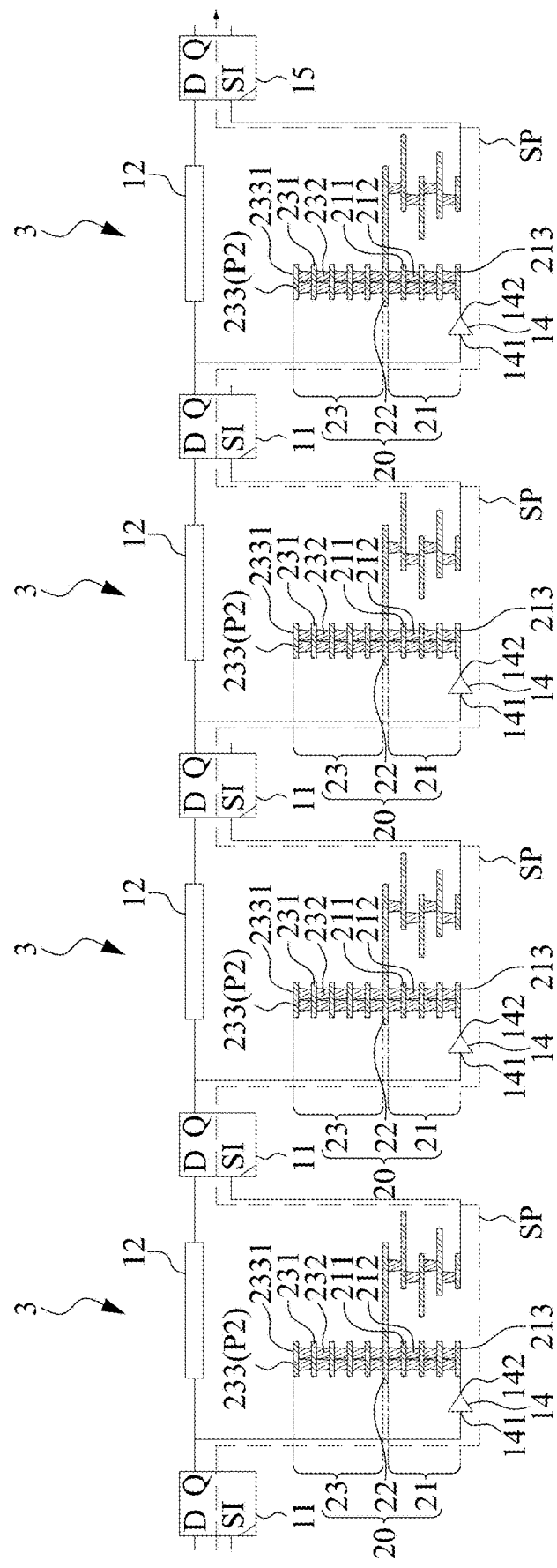
FIG. 7A is a block diagram of a semiconductor device in accordance with some embodiments of the present disclosure.

FIG. 7A is a block diagram of a semiconductor device 3A in accordance with some embodiments of the present disclosure. The semiconductor device 3A includes a plurality of semiconductor devices 3 as illustrated in FIG. 7. As shown in FIG. 7A, the semiconductor devices 3 may be connected in series, in which the cell 11 of a semiconductor device 3 is the cell 15 of the preceding semiconductor device 3. Each of the cells 14 (e.g., the buffer) has a terminal (e.g., the second terminal 142) connected to the snorkel structure 20. The potential of each of the cell 11 of the semiconductor devices 3 can be detected by a detector (e.g., the detector 100 in FIG. 2) through the buffer 14 and the snorkel structure 20.

Figure 7B:
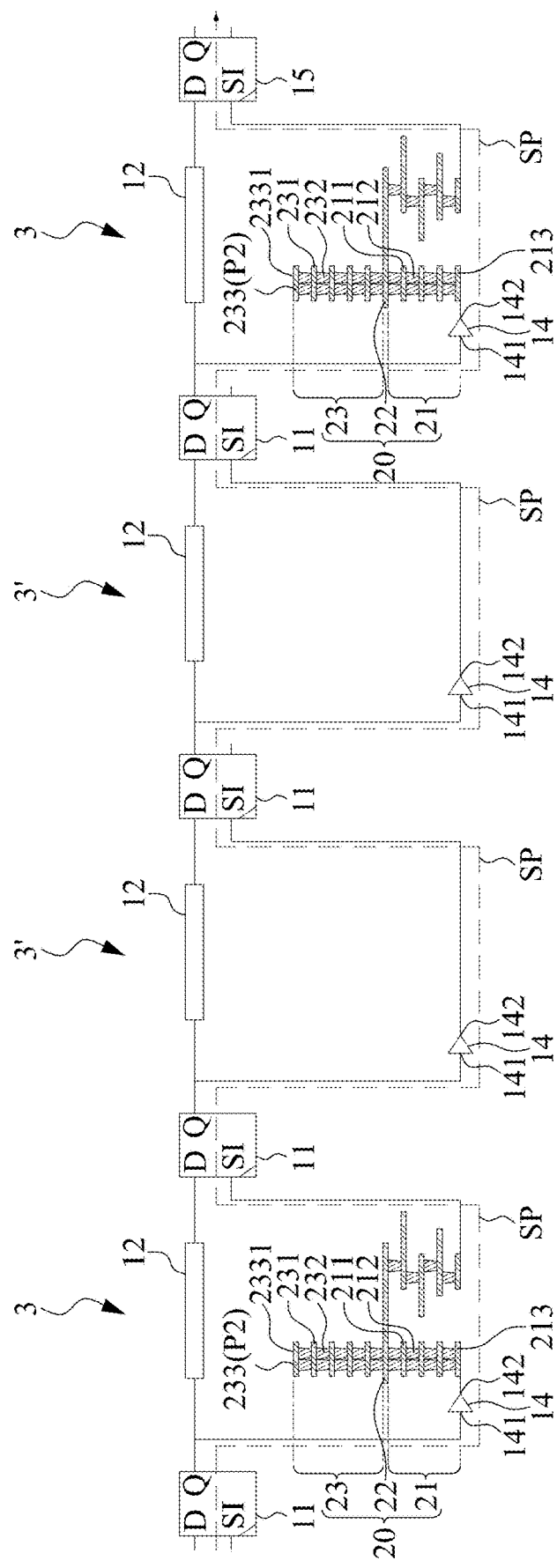
FIG. 7B is a block diagram of a semiconductor device in accordance with some embodiments of the present disclosure.

FIG. 7B is a block diagram of a semiconductor device 3B in accordance with some embodiments of the present disclosure. The semiconductor device 3B includes a plurality of semiconductor devices 3 as illustrated in FIG. 7. The semiconductor device 3B includes a plurality of semiconductor devices 3'. The semiconductor device 3' and the semiconductor device 3 differ in that the semiconductor device 3' lacks a snorkel structure. The semiconductor device 3 may be connected between two semiconductor devices 3'. Multiple semiconductor devices 3 may be connected between two semiconductor devices 3'. In some embodiments, the semiconductor device 3 may be inserted into a series of semiconductor devices 3', such that the cell 11 (e.g., the scan flip-flop circuit) may be detected. In other words, not all of the cells 11 are connected to a snorkel structure. As such, the RC delay induced by the snorkels structure(s) of the semiconductor device 3B will be less than that of the semiconductor device 3A.

Figure 8:
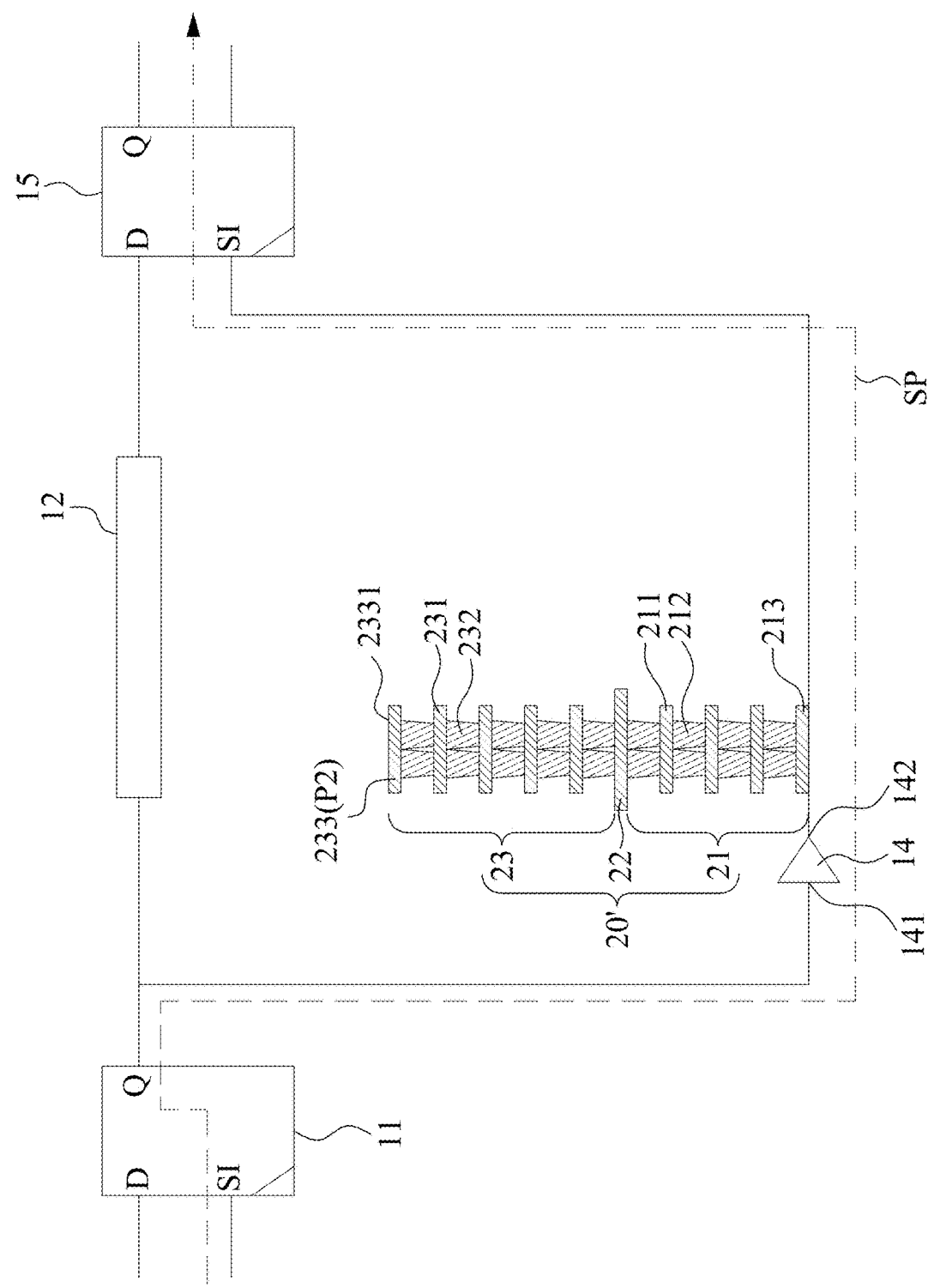
FIG. 8 is a block diagram of a semiconductor device in accordance with some embodiments of the present disclosure.

FIG. 8 is a block diagram of a semiconductor device 4 in accordance with some embodiments of the present disclosure. The semiconductor device 4 has a structure similar to that of the semiconductor device 3 as illustrated in FIG. 7. One of the differences between the semiconductor devices 3 and 4 is that a snorkel structure 20' is connected to the second terminal 142 of the buffer 14. The snorkel structure 20' is used for transmitting the second output signal of the second terminal 142 of the buffer 14 to the topmost conductive layer 233. The snorkel structure 20' and the snorkel structure 20 differ in that the snorkel structure 20' excludes a connection layer for connecting the buffer 14 and the scan flip-flop circuit 15.

Figure 9:
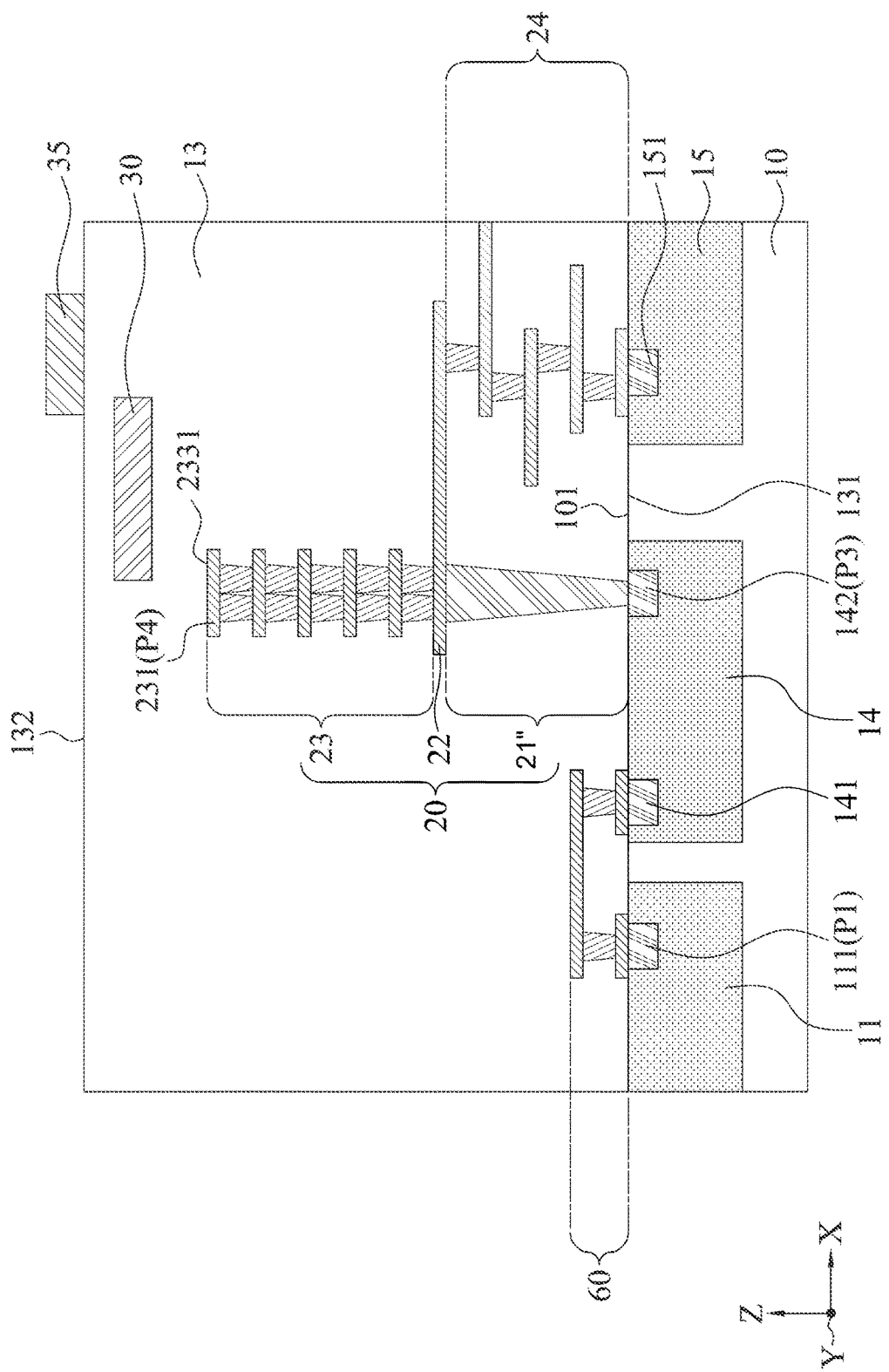
FIG. 9 is a cross-sectional view of a semiconductor device in accordance with some embodiments of the present disclosure.

FIG. 9 is a cross-sectional view of a semiconductor device 5 in accordance with some embodiments of the present disclosure. The semiconductor device 5 has a structure similar to that of the semiconductor device 3. One of the differences between the semiconductor devices 3 and 5 is that the snorkel structure 20 includes a through-silicon-via (TSV) 21", rather than the conductive structure 21 as illustrated in FIG. 1. The TSV 21" is disposed on the output terminal 142 of the cell 14. The TSV 21" may be electrically connected to the output terminal 142 of the cell 14. The TSV 21" may be electrically connected to the conductive layer 22.

In some embodiments, the TSV 21" includes metal, such as tungsten (W), copper (Cu), Ru, Ir, Ni, Os, Rh, Al, Mo, Co, alloys thereof, combinations thereof or any metallic material with suitable resistance and gap-fill capability.

Figure 10:
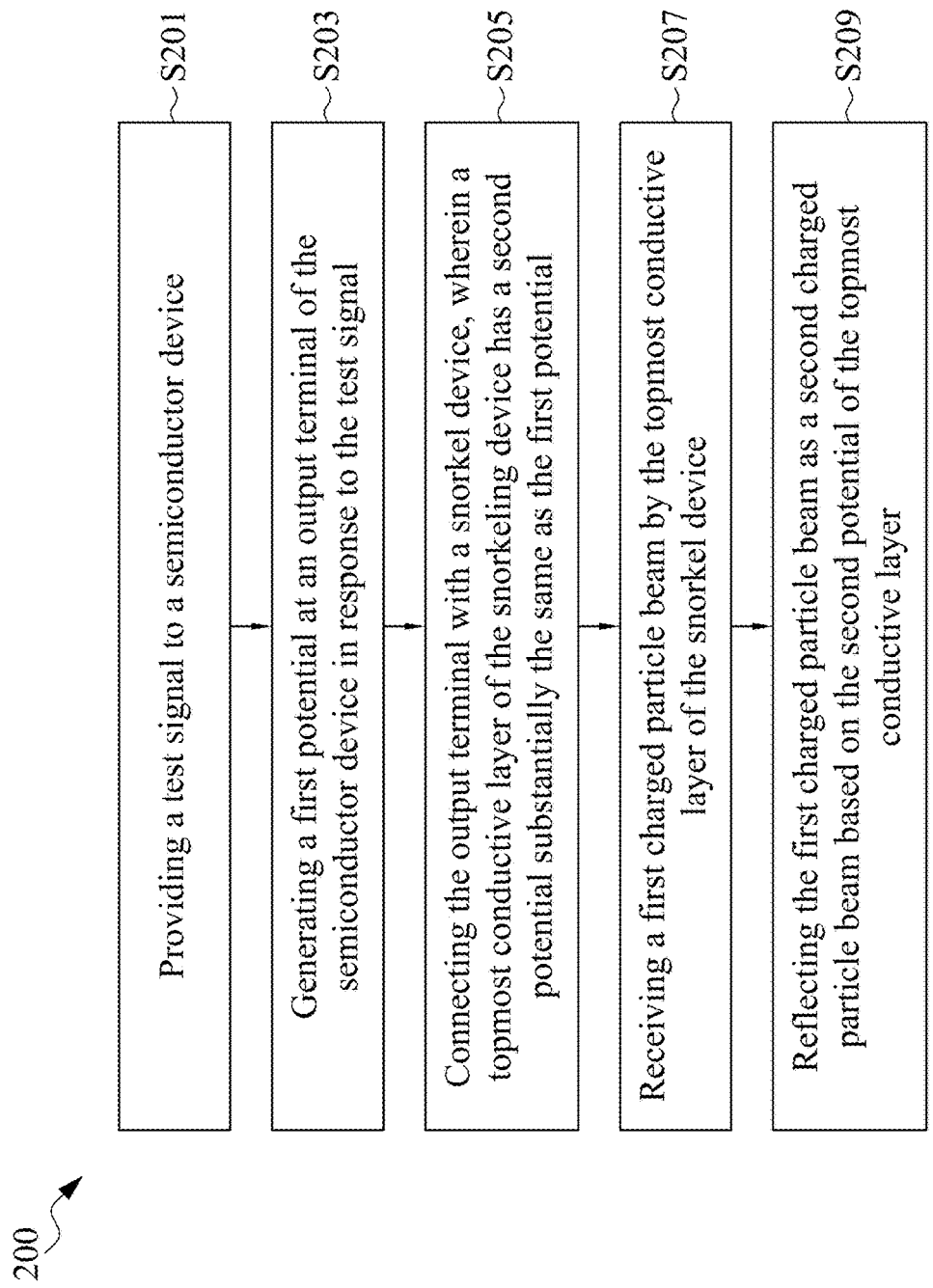
FIG. 10 is a flow chart of a method of failure analysis for a semiconductor device in accordance with some embodiments of the present disclosure.

FIG. 10 is a flow chart of a method 200 of failure analysis for a semiconductor device in accordance with some embodiments of the present disclosure.

The method 200 begins with operation S201 comprising providing a test signal to a semiconductor device.

The method 200 continues with operation S203 comprising generating a first potential at an output terminal of the semiconductor device in response to the test signal. The output terminal of the semiconductor device may be an output terminal of a scan flip-flop circuit.

The method 200 continues with operation S205 comprising connecting the output terminal with a snorkel device. A topmost conductive layer of the snorkel device has a second potential substantially the same as the first potential.

The method 200 continues with operation S207 comprising receiving a first charged particle beam by the topmost conductive layer of the snorkel device.

The method 200 continues with operation S209 comprising reflecting the first charged particle beam as a second charged particle beam based on the second potential of the topmost conductive layer. If the first potential is high (e.g., a logic value of 1), the second charged particle beam has a first energy, and if the first potential is low (e.g., a logic value of 0), the second charged particle beam has a second energy, wherein the first energy and the second energy are different. If any failure of the scan flip-flop circuit happens, the second potential of the topmost conductive layer of the snorkel structure would be abnormal or have an outlying value. As such, the method 200 may further comprise providing a warning to an engineer or an automatic system, and the engineer or the automatic system will disable the scan flip-flop circuit and find an alternative for the semiconductor device and/or will downgrade or abandon the semiconductor device.

The method 200 can be performed by a detector (e.g., the detector 100 of FIG. 2). In some embodiments, the detector includes a processor executing a set of instructions stored in non-transitory computer-readable medium to cause the detector to perform the method 200. The method 200 is merely an example, and is not intended to limit the present disclosure beyond what is explicitly recited in the claims. Additional operations can be provided before, during, or after each operation of the method 200, and some operations described can be replaced, eliminated, or moved around for additional embodiments of the method. In some embodiments, the method 200 can include further operations not depicted in FIG. 10. In some embodiments, the method 200 can include one or more operations depicted in FIG. 10.

Figure 11:
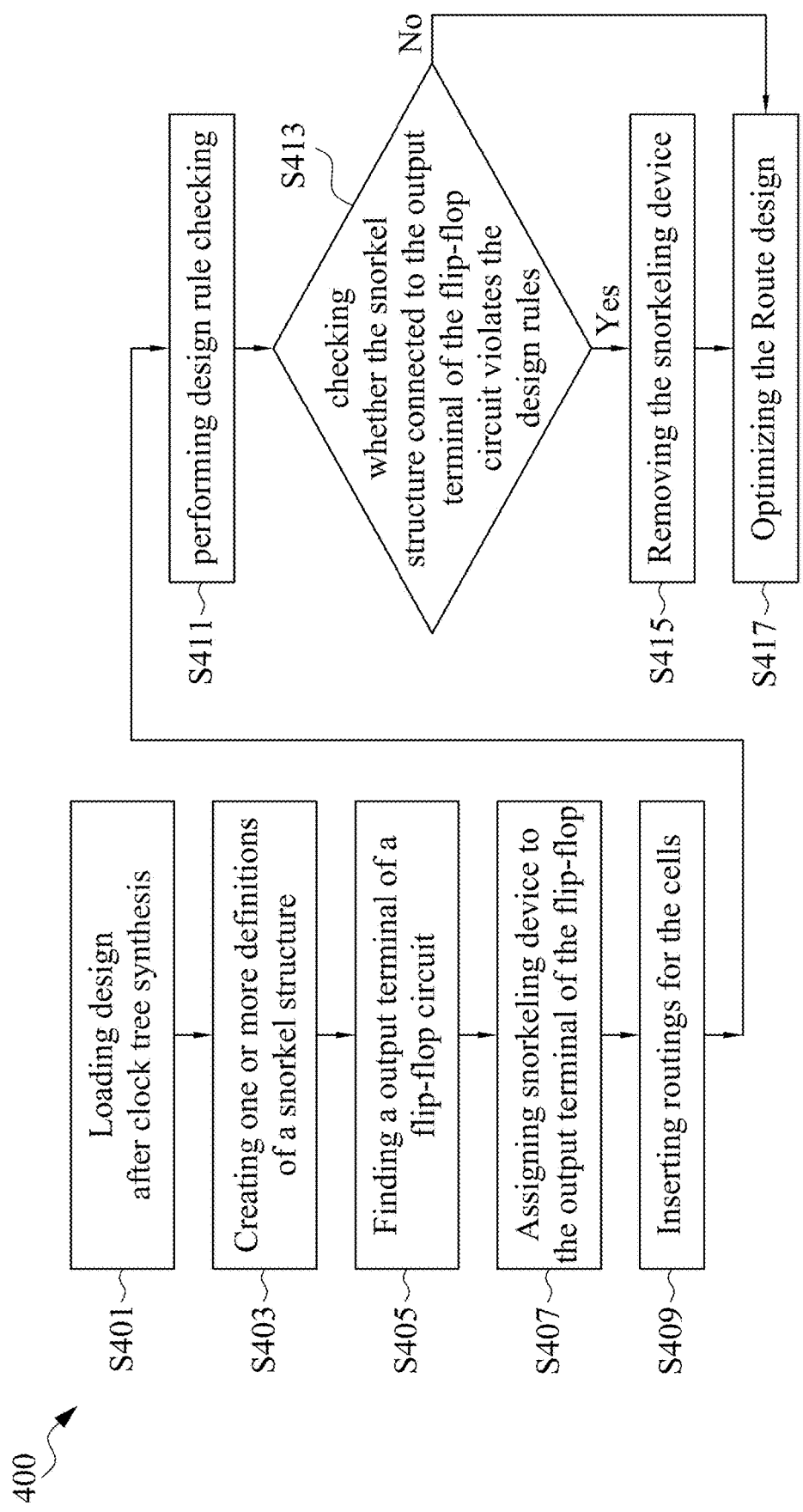
FIG. 11 is a flow chart of a routing method in accordance with some embodiments of the present disclosure.

FIG. 11 is a flow chart of a routing method 400 in accordance with some embodiments of the present disclosure.

The routing method 400 begins with operation S401 comprising a loading design after clock tree synthesis (CTS). In some embodiments, the loading design includes inserting design for testing (DFT). The loading design may also include performing an automatic placement and routing (APR) flow based on a plurality of cells. In some embodiments, the APR flow includes performing the setup of a floor plan, performing a placement for the cells, and/or performing the CTS. The cells include circuit blocks, such as a logic gate, scan flip-flop circuit, or buffer.

The routing method 400 continues with operation S403 comprising creating one or more definitions of a snorkel structure in library exchange format (LEF). In some embodiments, the snorkel structure includes at least one via pillars.

The routing method 400 continues with operation S405 comprising finding an output terminal of a scan flip-flop circuit.

The routing method 400 continues with operation S407 comprising assigning the snorkel structure to the output terminal of the scan flip-flop circuit.

The routing method 400 continues with operation S409 comprising inserting routings for the cells.

The routing method 400 continues with operation S411 comprising performing design rule checking (DRC). The DRC includes checking whether a violation exists in the routing and the cells based on design rules.

The routing method 400 continues with operation S413 comprising checking whether the snorkel structure connected to the output terminal of the scan flip-flop circuit violates the design rules. If yes, the routing method 400 continues with operation S415. If no, the routing method 400 continues with operation S417.

Operation S415 comprises removing the snorkel device from the output terminal of the scan flip-flop circuit. In some embodiment, the output terminal of some scan flip-flop circuits may not be connected to a snorkel structure, since the insertion of the snorkel structure may violate the design rules.

After the snorkel device is removed, the routing method 400 continues with operation S417.

Operation S417 comprises optimizing the routing based on the requirement of the hold time, setup time, or RC delay.

The routing method 400 is merely an example, and is not intended to limit the present disclosure beyond what is explicitly recited in the claims. Additional operations can be provided before, during, or after each operation of the method 400, and some operations described can be replaced, eliminated, or moved around for additional embodiments of the method. In some embodiments, the routing method 400 can include further operations not depicted in FIG. 11. In some embodiments, the routing method 400 can include one or more operations depicted in FIG. 11.

In some embodiments, if a designer would like to disable the snorkel structure, it is simple to remove one of the masks for forming the snorkel structure, such that the RC induced by the snorkel structure will not impact the timing of the semiconductor device.

Figure 12:
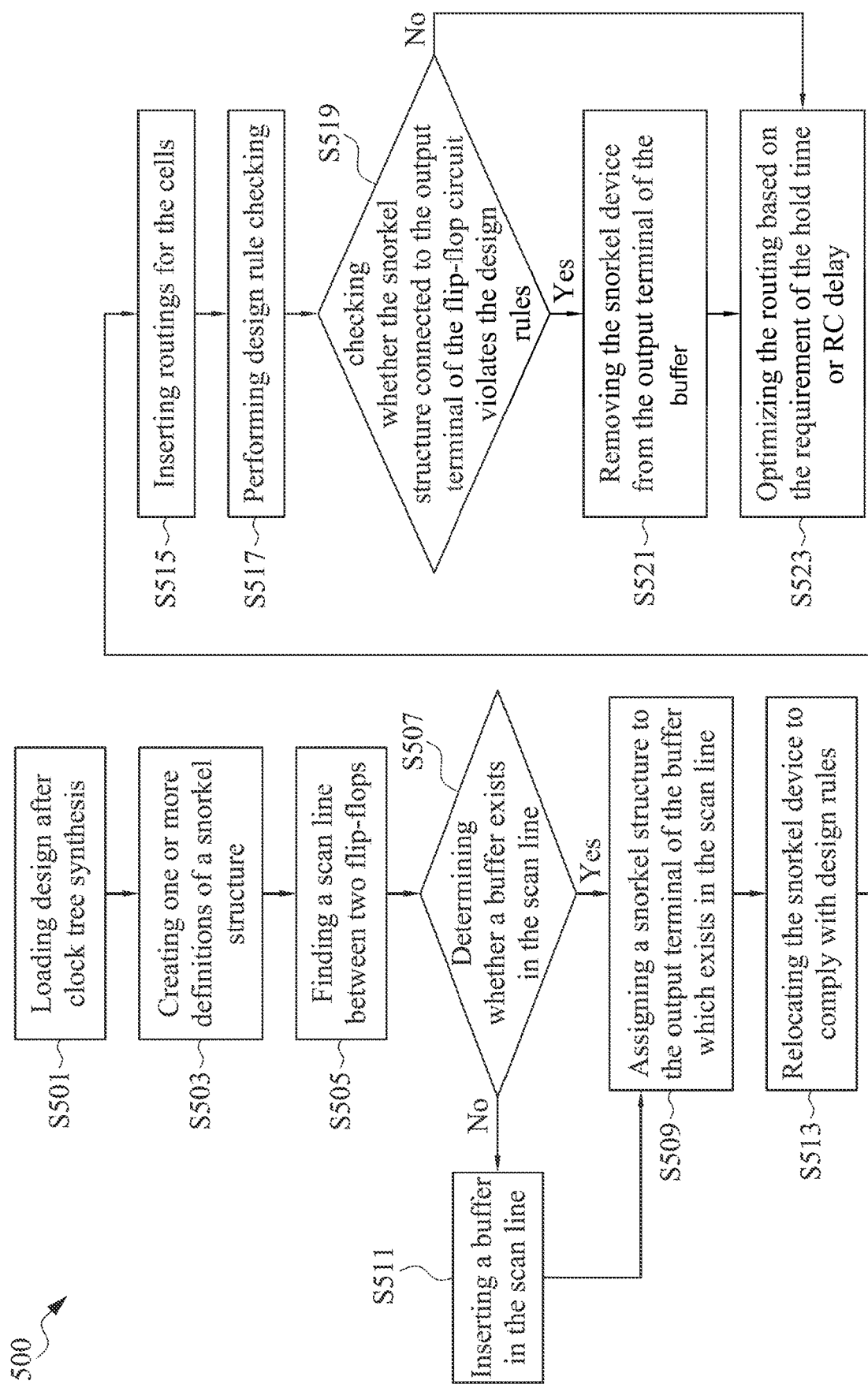
FIG. 12 is a flow chart of a routing method in accordance with some embodiments of the present disclosure.

FIG. 12 is a flow chart of a routing method 500 in accordance with some embodiments of the present disclosure.

The routing method 500 begins with operation S501 comprising a loading design after clock tree synthesis (CTS). In some embodiments, the loading design includes inserting design for testing (DFT). The loading design may also include performing an automatic placement and routing (APR) flow based on a plurality of cells. In some embodiments, the APR flow includes performing the setup of a floor plan, performing a placement for the cells, and/or performing the CTS. The cells include circuit blocks, such as a logic gate, scan flip-flop circuit, or buffer.

The routing method 500 continues with operation S503 comprising creating one or more definitions of a snorkel structure in library exchange format (LEF). In some embodiments, the snorkel structure includes at least one via pillars.

The routing method 500 continues with operation S505 comprising finding a scan line between two scan flip-flop circuits.

The routing method 500 continues with operation S507 comprising determining whether a buffer exists in the scan line. If yes, the routing method 500 continues with operation S509. If no, the routing method 500 continues with operation S511.

Operation S509 comprises assigning a snorkel structure to the output terminal of the buffer which exists in the scan line.

Operation S511 comprises inserting a buffer in the scan line. After the snorkel device is inserted, the routing method 500 continues with operation S509.

The routing method 500 continues with operation S513 comprising relocating the snorkel device to comply with design rules.

The routing method 500 continues with operation S515 comprising inserting routings for the cells.

The routing method 500 continues with operation S517 comprising performing design rule checking (DRC). The DRC includes checking whether a violation exists in the routing and the cells based on design rules.

The routing method 500 continues with operation S519 comprising checking whether the snorkel structure connected to the output terminal of the buffer violates the design rules. If yes, the routing method 500 continues with operation S521. If no, the routing method 500 continues with operation S523.

Operation S521 comprises removing the snorkel device from the output terminal of the buffer. In some embodiment, the output terminal of some buffers in scan lines may not be connected to a snorkel structure, since the insertion of the snorkel structure may violate the design rules.

After the snorkel device is removed, the routing method 500 continues with operation S521.

Operation S523 comprises optimizing the routing based on the requirement of the hold time, setup time, or RC delay.

The routing method 500 is merely an example, and is not intended to limit the present disclosure beyond what is explicitly recited in the claims. Additional operations can be provided before, during, or after each operation of the method 500, and some operations described can be replaced, eliminated, or moved around for additional embodiments of the method. In some embodiments, the routing method 500 can include further operations not depicted in FIG. 12. In some embodiments, the routing method 500 can include one or more operations depicted in FIG. 12.

Figure 13:
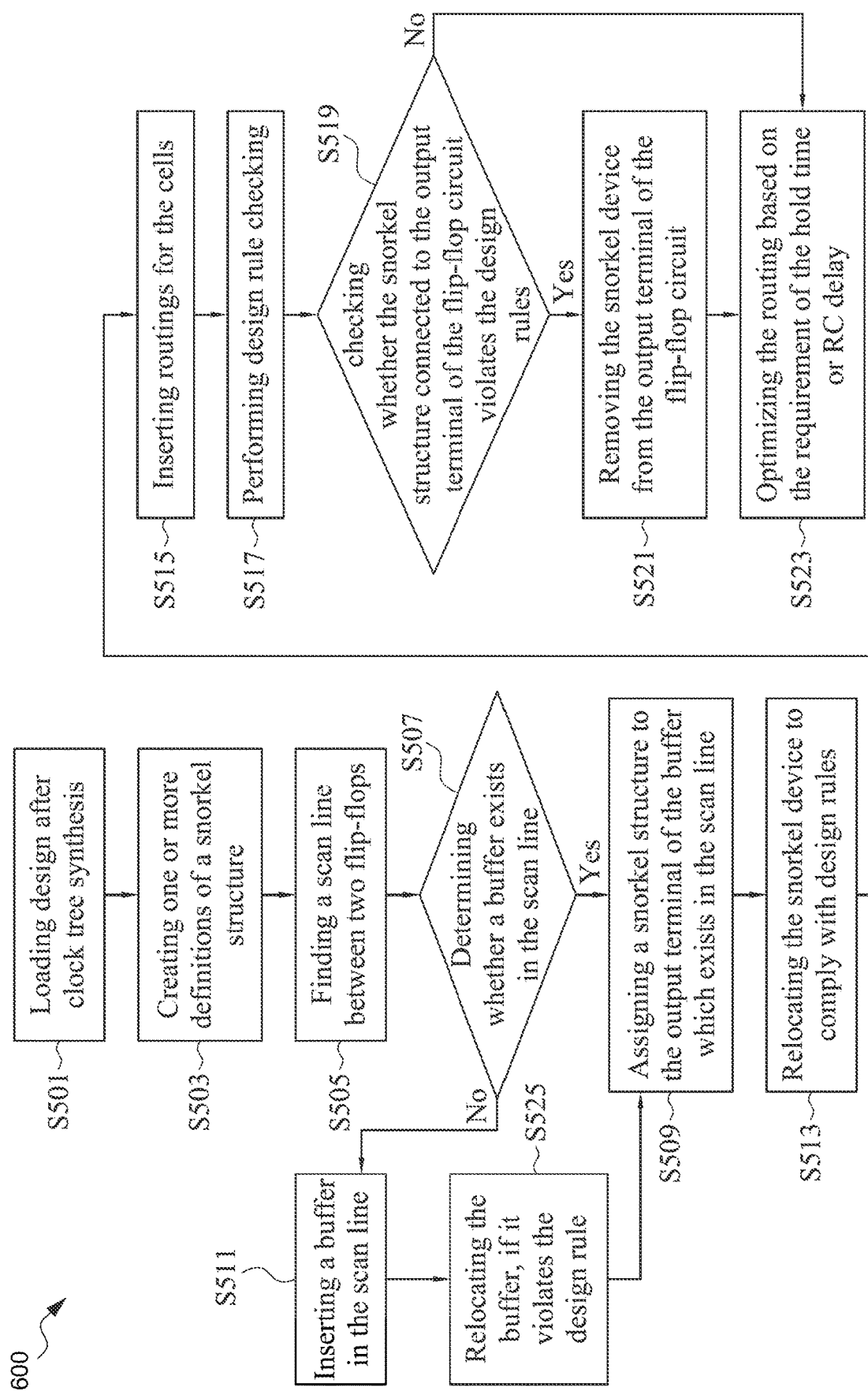
FIG. 13 is a flow chart of a routing method in accordance with some embodiments of the present disclosure.

FIG. 13 is a flow chart of a routing method 600 in accordance with some embodiments of the present disclosure. The routing method 600 is similar to the routing method 500 as illustrated in FIG. 12. One of the differences between the routing methods 500 and 600 is that the routing method 600 further comprises operation S525.

Operation S525 may follow operation S511. Operation S525 comprises relocating the inserted buffer, if it violates the design rules. In some embodiments, the design rules include that a distance between two inserted buffers should be greater than the summation of the enclosure of the snorkel structure and the distance from end to end of the snorkel structure. The routing method 600 may continue with operation S509.

The routing method 600 is merely an example, and is not intended to limit the present disclosure beyond what is explicitly recited in the claims. Additional operations can be provided before, during, or after each operation of the method 600, and some operations described can be replaced, eliminated, or moved around for additional embodiments of the method. In some embodiments, the routing method 600 can include further operations not depicted in FIG. 13. In some embodiments, the routing method 600 can include one or more operations depicted in FIG. 13.

Figure 14:
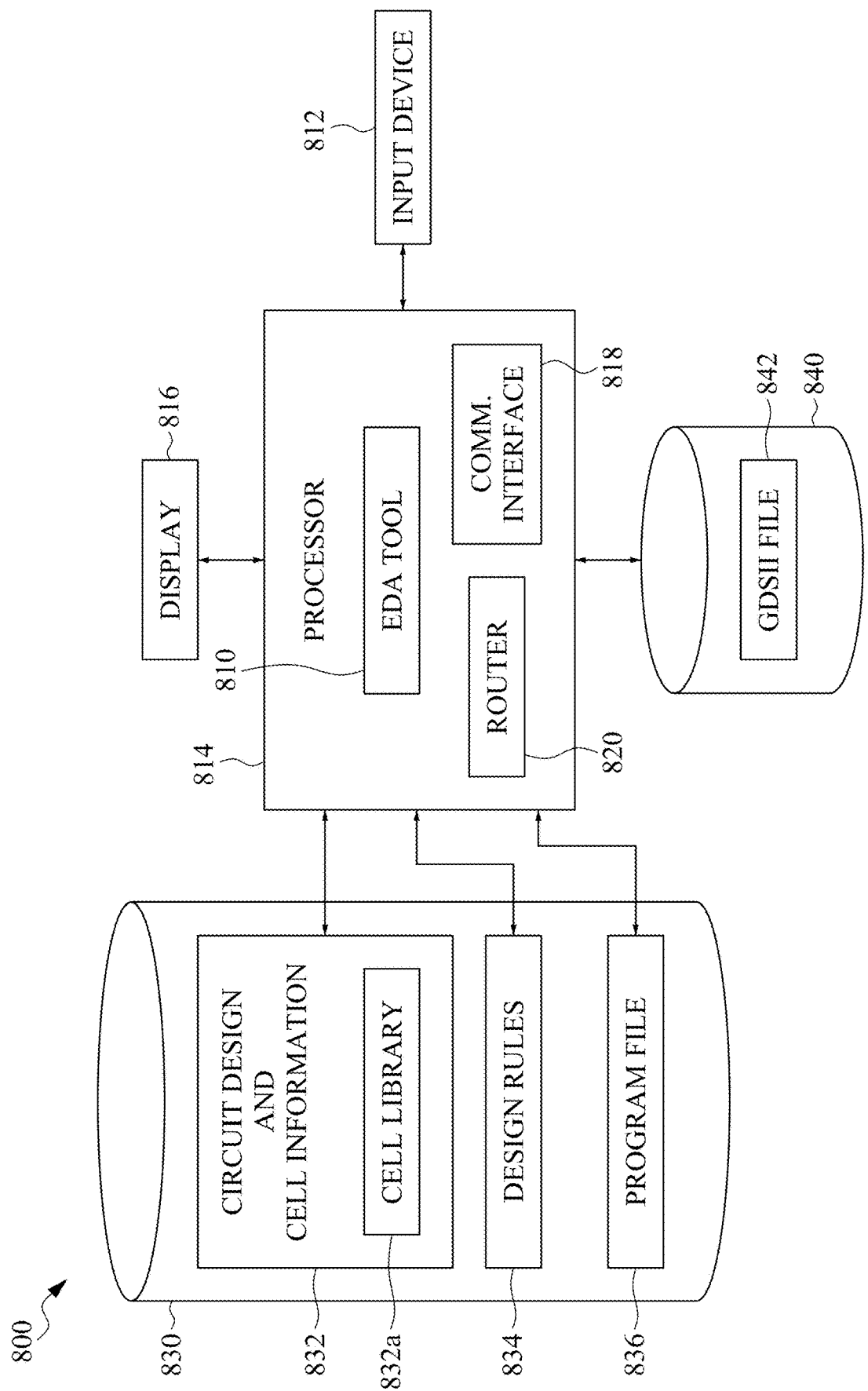
FIG. 14 is a diagram illustrating an electronic design automation system, in accordance with some embodiments of the present disclosure.

FIG. 14 is a diagram illustrating an electronic design automation system 800 in accordance with some embodiments. As shown in FIG. 14, the electronic design automation system 800 includes an electronic design automation ("EDA") tool 810 having a place and route tool including a chip assembly router 820.

The EDA tool 810 is a special purpose computer configured to retrieve stored program instructions 836 from a computer readable storage medium 830 and 840 and execute the instructions on a general purpose processor 814. Processor 814 may be any central processing unit ("CPU"), microprocessor, micro-controller, or computational device or circuit for executing instructions. The non-transitory computer readable storage medium 830 and 840 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

In some embodiments, system 800 includes a display 816 and a user interface or input device 812 such as, for example, a mouse, a touch screen, a microphone, a trackball, a keyboard, or other device through which a user may input design and layout instructions to system 800. In some embodiments, the one or more computer readable storage mediums 830 and 840 may store data input by a user such as a circuit design and cell information 832, which includes a cell library 832a, design rules 834, one or more program files 836, and one or more graphical data system ("GDS") II files 842.

EDA tool 810 may also include a communication interface 818 allowing software and data to be transferred between EDA tool 810 and external devices. Examples of a communications interface 818 include, but are not limited to, a modem, an Ethernet card, a wireless network card, a Personal Computer Memory Card International Association ("PCMCIA") slot and card, or the like. Software and data transferred via communications interface 818 may be in the form of signals, which may be electronic, electromagnetic, optical, or the like that are capable of being received by communications interface 818. These signals may be provided to communications interface 818 via a communications path (e.g., a channel), which may be implemented using wire, cable, fiber optics, a telephone line, a cellular link, a radio frequency ("RF") link and other communication channels. The communications interface 818 may be a wired link and/or a wireless link coupled to a local area network (LAN) or a wide area network (WAN).

Router 820 is capable of receiving an identification of a plurality of cells to be included in a circuit layout, including a list 832 of pairs of cells. The plurality of cells can be connected to each other. In some embodiments, the list 832 can be selected from the cell library 832a. Design rules 834 may be used for a variety of processing technologies. In some embodiments, the design rules 834 configure the router 820 to locate connecting lines and vias on a manufacturing grid. Other embodiments may allow the router to include off-grid connecting lines and/or vias in the layout.

Figure 15:
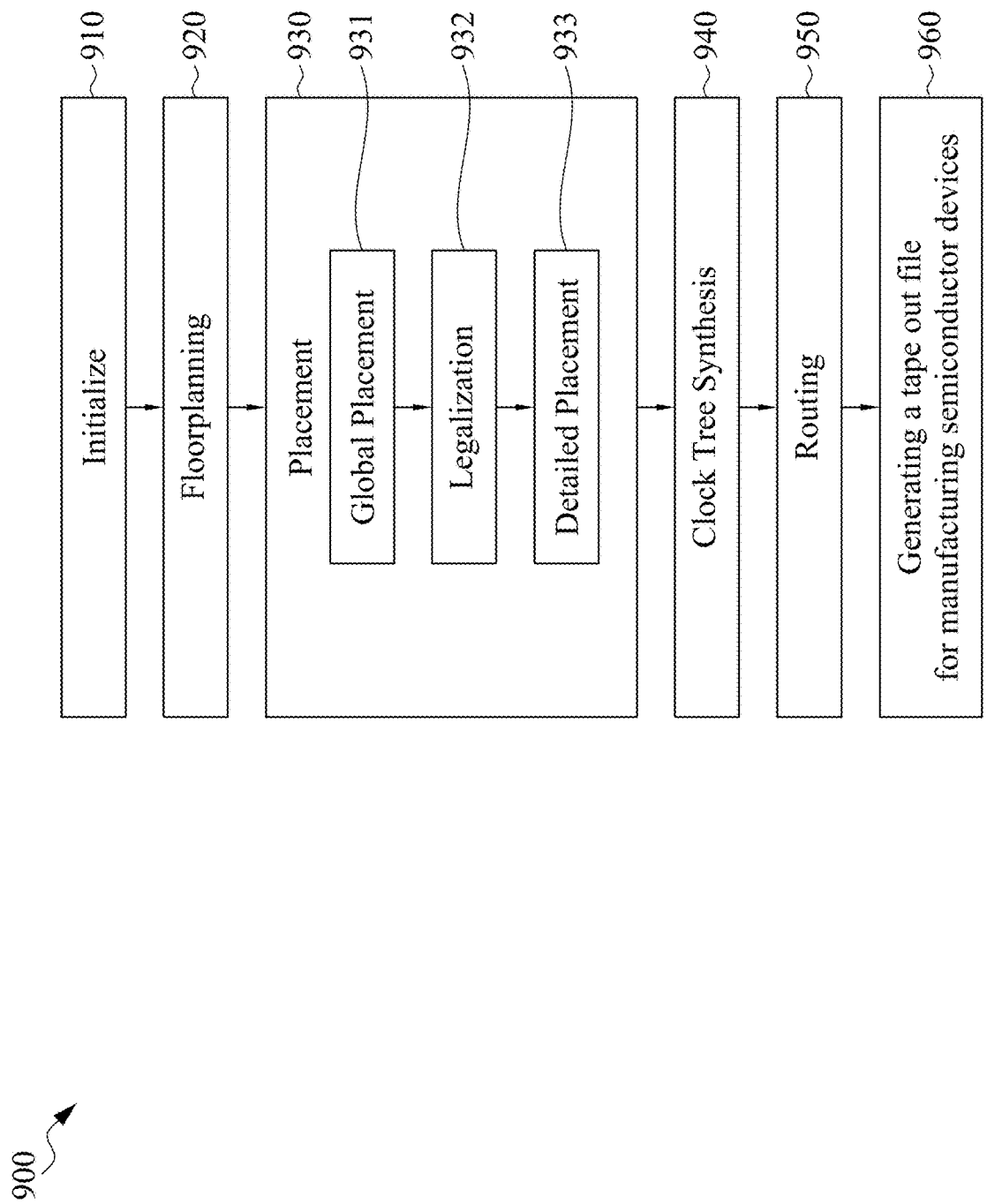
FIG. 15 is a flowchart showing a method for generating a simulated integrated circuit design layout, in accordance with some embodiments of the present disclosure.

FIG. 15 is a flowchart 900 showing a method for generating a simulated integrated circuit design layout, in accordance with some embodiments of the present disclosure. In some embodiments, this method may correspond to an automatic placement and routing (APR) process. In some embodiments, the APR process of the present disclosure may be applied to any suitable simulated integrated circuit design layout.

The APR process shown in FIG. 15 may begin in operation 910, initializing a pre-placement of a simulated integrated circuit design layout. For example, the pre-placement simulation may be generated according to design data corresponding to an integrated circuit layout stored in a data storage device. In some embodiments, the pre-placement simulation may be executed on the design, e.g., by an EDA tool, to determine whether the design meets a predetermined specification. If the design does not meet the predetermined specification, the semiconductor device is redesigned. In some embodiments, a SPICE simulation is performed on the SPICE netlist. Other simulation tools can be employed, in place of or in addition to the SPICE simulation, in other embodiments.

In operation 920, floor planning for the integrated circuit is performed, for example, by system 800. In some embodiments, floor planning includes dividing a circuit into functional blocks, which are portions of the circuit, and identifying the layout for these functional blocks.

In operation 930, an automated placement tool may create a transistor level design by placing cells from a cell library to form the various logic and functional blocks according to the IC design. In some embodiments, the system 800 performs placement for the integrated circuit. In some embodiments, operation 930 includes determining the placement for the electronic components, circuitry, and logic elements. For example, the placement of the transistors, resistors, inductors, logic gates, and other elements of the integrated circuit can be selected in operation 930.

In some embodiments, operation 930 can include sub-operations of global placement 931, legalization 932, and detailed placement 933.

Global placement 931 is a rough placement of the simulated integrated circuit design layout. In some embodiments, global placement 931 includes distributing the cells in the simulated integrated circuit design layout with overlaps. During global placement 931, a placement tool can be used to generate an automatic placement of the cells with approximately regular cell densities while minimizing wire length. Global placement 931 can utilize partitioning-based techniques, simulated annealing-based techniques, analytical placement techniques, or any combination thereof. In some embodiments, the simulated integrated circuit design layout includes cells arranged in rows. In one embodiment, the cell rows in the simulated integrated circuit design layout can be of the same height. In another embodiment, the cell rows in the simulated integrated circuit design layout can be of different heights.

After global placement 931, cells may still overlap and be misaligned with the rows. To remedy the overlap and misalignment, legalization 932 includes removing any remaining overlaps between the cells and aligning all the cells in the simulated integrated circuit design layout. That is, legalization 932 legalizes global placement 931. In other words, legalization 932 places cells at legal placement sites and removes overlaps. Therefore, legalization 932 removes white spaces in the simulated integrated circuit design layout.

Detailed placement 933 further improves wire length (or other problems) by locally rearranging the cells while maintaining legality. That is, the detailed placement 933 provides a final placement based on the legality and wire length.

In operation 940, Clock Tree Synthesis (CTS) may be performed after the placement of cells. In some embodiments, a CTS tool synthesizes a clock tree for the entire simulated integrated circuit design layout. As it does so, the CTS tool establishes only an approximate position for each buffer forming the clock tree and only approximates the routing of signal paths that will link the buffers to one another and to synchronization, so that it can make reasonably accurate estimates of signal path delays through the clock tree.

In operation 950, an automatic routing tool then determines the connections needed between the devices in the cells, such as MOS transistors. Multiple transistors are coupled together to form functional blocks, such as adders, multiplexers, registers, and the like, in the routing step. Routing comprises the placement of signal net wires on a metal layer within placed cells to carry non-power signals between different functional blocks. In some embodiments, signal net wires are routed on the same metal level as one of the vertically adjacent metal layers in the multilevel power rails.

Once the routing is determined, automated layout tools are used to map the cells and the interconnections from the router onto a semiconductor device using the process rules and the design rules, as provided. All of these software tools are available commercially for purchase. Cell libraries that are parameterized for certain semiconductor wafer manufacturing facilities are also available.

In operation 960, a tape out data file corresponding to an integrated circuit layout of a semiconductor device may be generated. In some embodiments, the integrated circuit design layouts can include FinFET devices and/or other planar or more complex structural semiconductor manufacturing processes.

Figure 16:
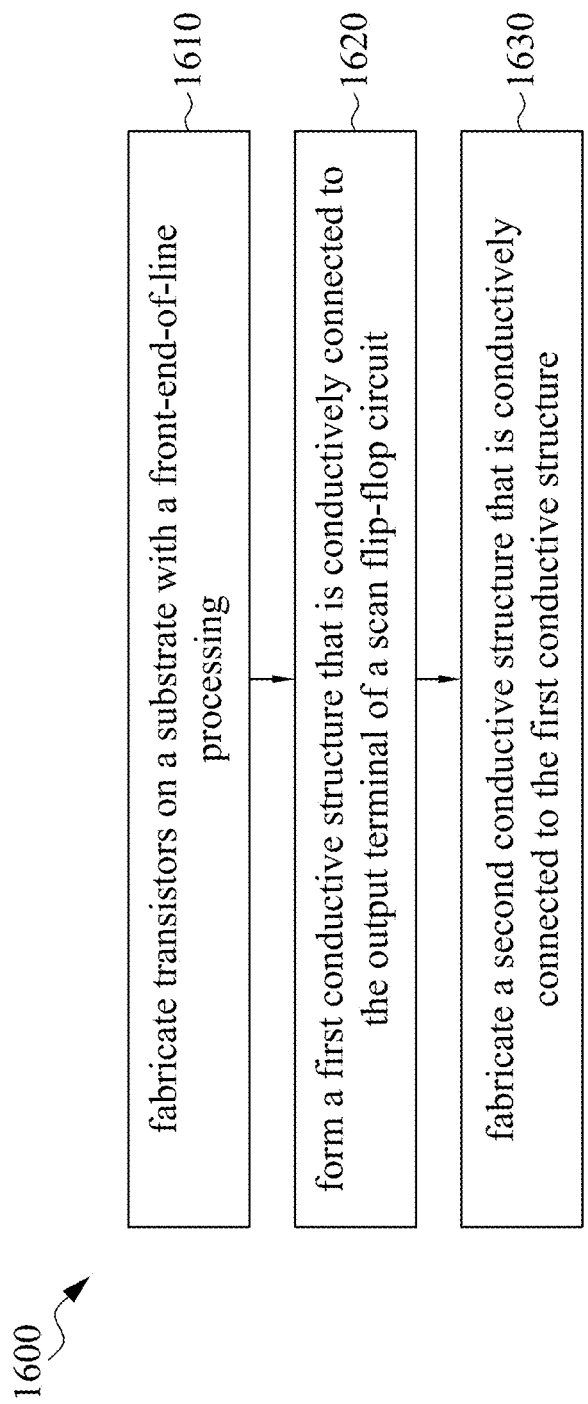
FIG. 16 is a flow chart of a method 1600 of manufacturing an integrated circuit, in accordance with some embodiments.

FIG. 16 is a flow chart of a method 1600 of manufacturing an integrated circuit, in accordance with some embodiments. The sequence in which the operations of method 1600 are depicted in FIG. 16 is for illustration only; the operations of method 1600 are capable of being executed in sequences that differ from that depicted in FIG. 16. It is understood that additional operations may be performed before, during, and/or after the method 1600 depicted in FIG. 16, and that some other processes may only be briefly described herein.

In operation 1610 of method 1600, transistors are fabricated on a substrate with a front-end-of-line processing. One of the transistors has a drain terminal connected to an output terminal of a scan flip-flop circuit. In the example embodiments as shown in FIG. 1, when the cell 11 is a circuit cell of a scan flip-flop circuit, the output terminal 111 is the output terminal of the scan flip-flop circuit.

In operation 1620 of method 1600, a first conductive structure is formed in such a way that the first conductive structure is conductively connected to the output terminal of a scan flip-flop circuit. In the example embodiments as shown in FIG. 1, the conductive structure 21 is disposed on the cell 11. In some embodiments, the cell 11 is a circuit cell of a scan flip-flop circuit which has the output terminal 111 conductively connected to the conductive structure 21.

During operation 1620 of forming the first conductive structure, a plurality of landing portions in multiple metal layers and a plurality of conductive vias in multiple layers of interlayer dielectric are fabricated. Each of the conductive vias is conductively connected between two of the landing portions. In the example embodiments as shown in FIG. 1, the landing portions 211 and the conductive vias 212 are fabricated. One of the conductive vias 212 connects the first one of the landing portions 211 and the second one of the landing portions 211, which can be higher or lower than the first one of the landing portions 211.

During operation 1620 of forming the first conductive structure and fabricating the landing portions, in some embodiments, a landing portion in a selected metal layer is fabricated with an etching process. The etching process includes removing metal materials in the selected metal layer surrounding the landing portion to isolate the landing portion from other conductive elements in the selected metal layer.

In operation 1630 of method 1600, a second conductive structure is fabricated in such a way that the second conductive structure is conductively connected to the first conductive structure. The second conductive structure has a topmost conductive layer that is conductively connected to the output terminal of a scan flip-flop circuit through the first conductive structure and the topmost conductive layer is configured to receive an e-beam signal. In the example embodiments as shown in FIG. 1, the conductive structure 23 is fabricated. The conductive structure 23 includes a plurality of landing portions 231 and a plurality of conductive vias 232. One of the conductive vias 232 connects the first one of the landing portions 231 and the second one of the landing portions 231, which can be higher or lower than the first one of the landing portions 231. The bottommost one of the conductive vias 232 of the conductive structure 23 is connected to the conductive layer 22. The conductive layer 22 is disposed on and electrically connected to the conductive structure 21. The topmost conductive layer 233 has a surface 2331, which is configured to receive an e-beam signal B1.

Figure 17:
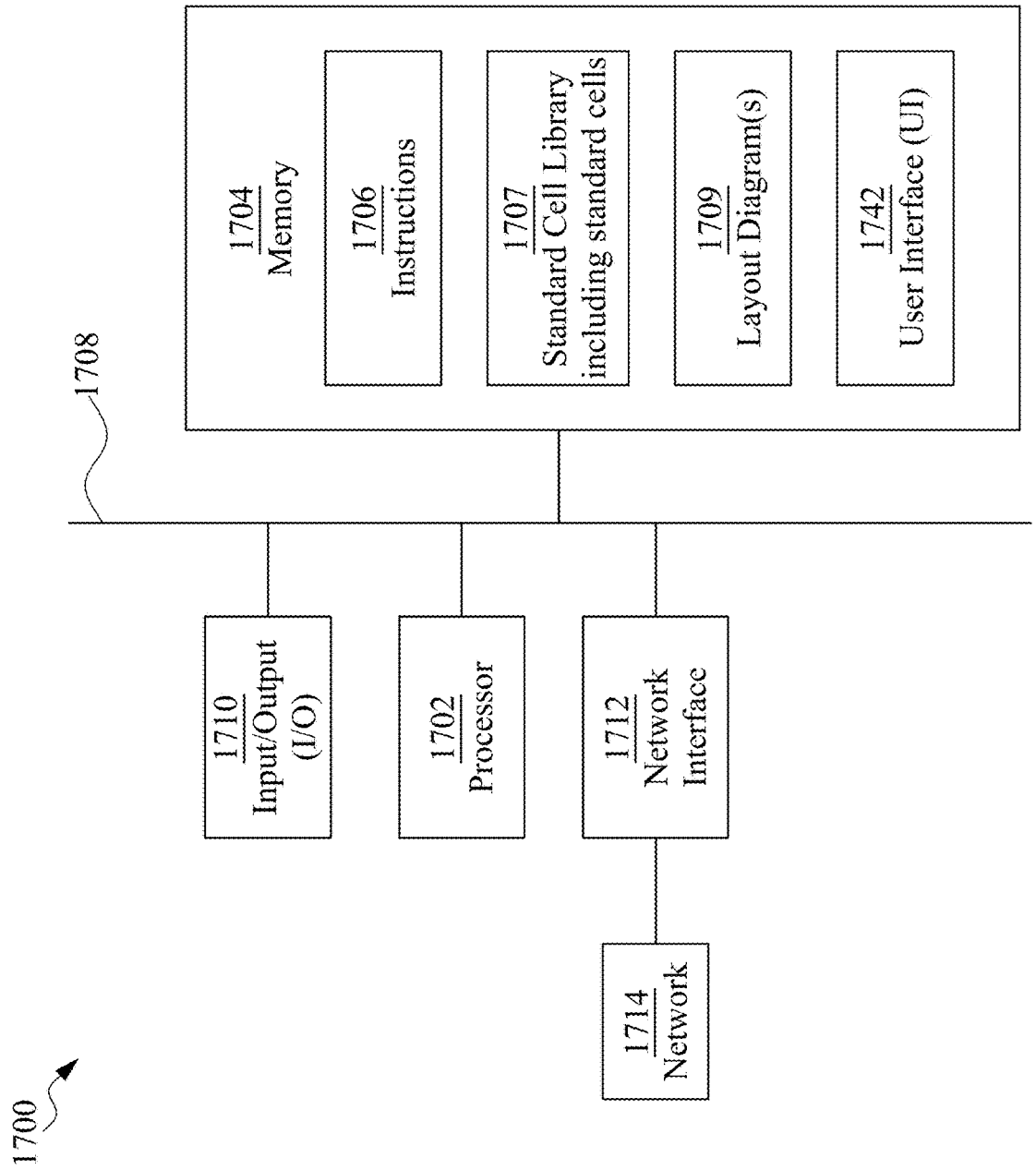
FIG. 17 is a block diagram of an IC layout diagram generation system, in accordance with some embodiments.

FIG. 17 is a block diagram of IC design system 1700, in accordance with some embodiments. Methods described herein of designing IC layout diagrams in accordance with one or more embodiments are implementable, for example, using IC design system 1700, in accordance with some embodiments. In some embodiments, IC design system 1700 can be an APR system, can include an APR system, or can be a part of an APR system, usable for performing an APR method.

In some embodiments, IC design system 1700 includes a processor 1702 and non-transitory, computer-readable memory 1704. Memory 1704, amongst other things, is encoded with, i.e., stores, computer program code, i.e., a set of executable instructions 1706. Execution of instructions 1706 by the processor 1702 represents (at least in part) an EDA tool which implements a portion or all of a method, e.g., a method of generating an IC layout diagram described above (hereinafter, the noted processes and/or methods).

Processor 1702 is electrically coupled to computer-readable memory 1704 via a bus 1708. Processor 1702 is also electrically coupled to an I/O interface 1710 by bus 1708. Network interface 1712 is also electrically connected to processor 1702 via bus 1708. Network interface 1712 is connected to a network 1714, so that processor 1702 and computer-readable memory 1704 are capable of connecting to external elements via network 1714. Processor 1702 is configured to execute instructions 1706 encoded in computer-readable memory 1704 in order to cause IC design system 1700 to be usable for performing a portion or all of the noted processes and/or methods. In one or more embodiments, processor 1702 is a central processing unit (CPU), a multi-processor, a distributed processing system, an application specific integrated circuit (ASIC), and/or a suitable processing unit.

In one or more embodiments, memory 1704 is an electronic, magnetic, optical, electromagnetic, infrared, and/or a semiconductor system (or apparatus or device). For example, memory 1704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1704 includes a compact disk-read only memory (CD-ROM), a compact disk-read/write (CD-R/W), and/or a digital video disc (DVD).

In one or more embodiments, memory 1704 stores instructions 1706 configured to cause IC design system 1700 (where such execution represents (at least in part) the EDA tool) to be usable for performing a portion or all of the noted processes and/or methods. In one or more embodiments, memory 1704 also stores information which facilitates performing a portion or all of the noted processes and/or methods. In one or more embodiments, memory 1704 includes IC design storage 1707 configured to store one or more IC layout diagrams 1709.

IC design system 1700 includes I/O interface 1710. I/O interface 1710 is coupled to external circuitry. In one or more embodiments, I/O interface 1710 includes a keyboard, keypad, mouse, trackball, trackpad, touchscreen, and/or cursor direction keys for communicating information and commands to processor 1702.

IC design system 1700 also includes network interface 1712 coupled to processor 1702. Network interface 1712 allows IC design system 1700 to communicate with network 1714, to which one or more other computer systems are connected. Network interface 1712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1700.

IC design system 1700 is configured to receive information through I/O interface 1710. The information received through I/O interface 1710 includes one or more of instructions, data, design rules, libraries of standard cells, and/or other parameters for processing by processor 1702. The information is transferred to processor 1702 via bus 1708. IC design system 1700 is configured to receive information related to a UI through I/O interface 1710. The information is stored in memory 1704 as user interface (UI) 1742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 18:
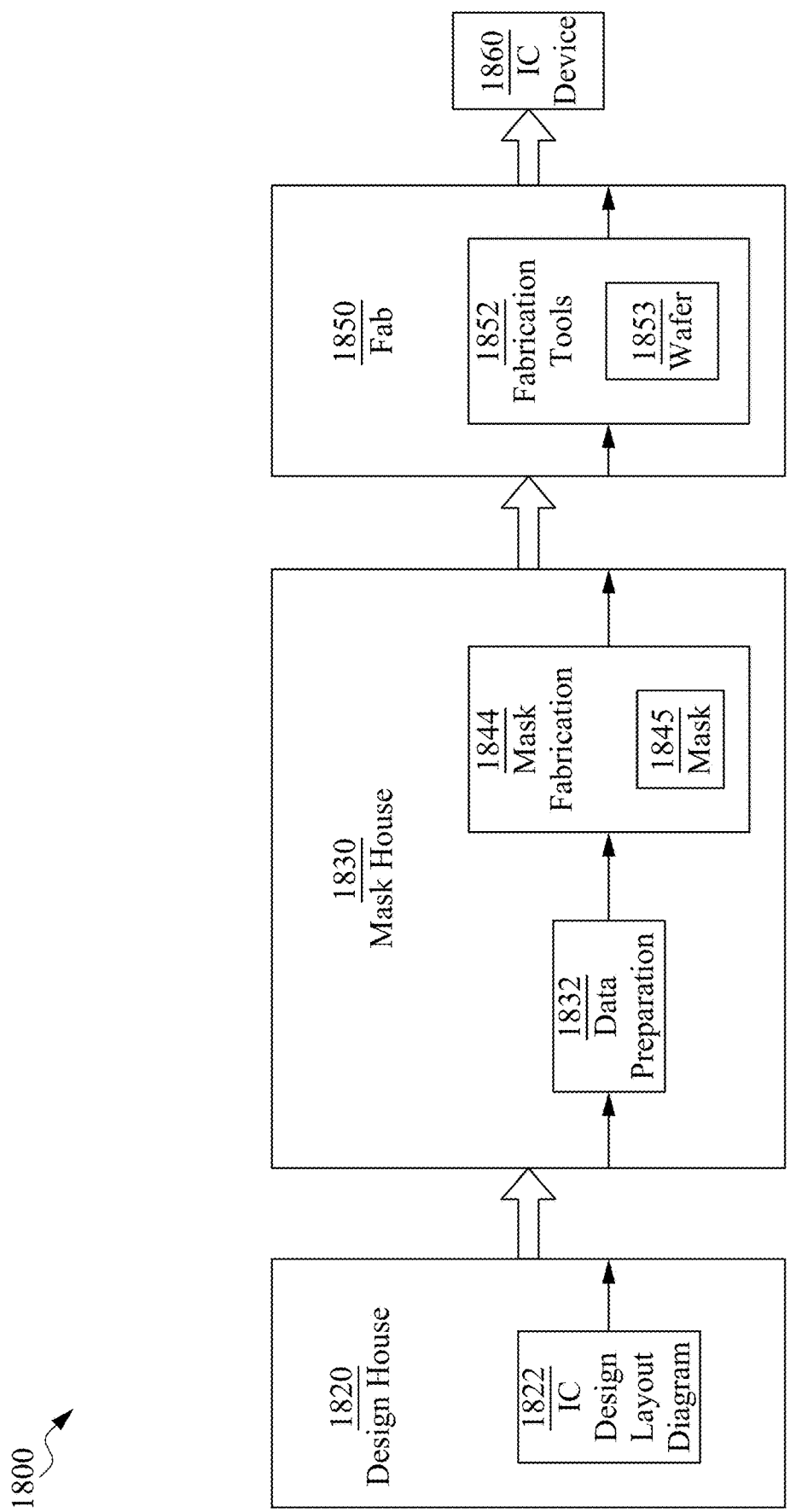
FIG. 18 is a block diagram of an IC manufacturing system, and an IC manufacturing flow associated therewith, in accordance with some embodiments.

FIG. 18 is a block diagram of IC manufacturing system 1800, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1800.

In FIG. 18, IC manufacturing system 1800 includes entities, such as a design house 1820, a mask house 1830, and an IC manufacturer/fabricator ("fab") 1850, that interact with one another in the design, development, and manufacturing cycles and/or services related to manufacturing an IC device 1860. The entities in system 1800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1820, mask house 1830, and IC fab 1850 is owned by a single larger company. In some embodiments, two or more of design house 1820, mask house 1830, and IC fab 1850 coexist in a common facility and use common resources.

Design house (or design team) 1820 generates an IC design layout diagram 1822. IC design layout diagram 1822 includes various geometrical patterns, e.g., an IC layout diagram discussed above. The geometrical patterns correspond to patterns of metal, oxide, or semiconductor layers that make up the various components of IC device 1860 to be fabricated. The various layers combine to form various IC features. For example, a portion of IC design layout diagram 1822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1820 implements a proper design procedure to form IC design layout diagram 1822. The design procedure includes one or more of logic design, physical design or place and route. IC design layout diagram 1822 is presented in one or more data files having information of the geometrical patterns. For example, IC design layout diagram 1822 can be expressed in a GDSII file format or DFII file format.

Mask house 1830 includes data preparation 1832 and mask fabrication 1844. Mask house 1830 uses IC design layout diagram 1822 to manufacture one or more masks 1845 to be used for fabricating the various layers of IC device 1860 according to IC design layout diagram 1822. Mask house 1830 performs mask data preparation 1832, where IC design layout diagram 1822 is translated into a representative data file (RDF). Mask data preparation 1832 provides the RDF to mask fabrication 1844. Mask fabrication 1844 includes a mask writer. A mask writer converts the RDF to an image on a substrate, such as mask (reticle) 1845 or a semiconductor wafer 1853. The design layout diagram 1822 is manipulated by mask data preparation 1832 to comply with particular characteristics of the mask writer and/or requirements of IC fab 1850. In FIG. 18, mask data preparation 1832 and mask fabrication 1844 are illustrated as separate elements. In some embodiments, mask data preparation 1832 and mask fabrication 1844 can be collectively referred to as mask data preparation.

In some embodiments, mask data preparation 1832 includes optical proximity correction (OPC) which uses lithography enhancement techniques to compensate for image errors, such as those that can arise from diffraction, interference, other process effects and the like. OPC adjusts IC design layout diagram 1822. In some embodiments, mask data preparation 1832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1832 includes a mask rule checker (MRC) that checks the IC design layout diagram 1822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1822 to compensate for limitations during mask fabrication 1844, which may undo part of the modifications performed by OPC in order to meet mask creation rules.

In some embodiments, mask data preparation 1832 includes lithography process checking (LPC) that simulates processing that will be implemented by IC fab 1850 to fabricate IC device 1860. LPC simulates this processing based on IC design layout diagram 1822 to create a simulated manufactured device, such as IC device 1860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1822.

It should be understood that the description of mask data preparation 1832 has been simplified for the purposes of clarity. In some embodiments, data preparation 1832 includes additional features such as a logic operation (LOP) to modify the IC design layout diagram 1822 according to manufacturing rules. Additionally, the processes applied to IC design layout diagram 1822 during data preparation 1832 may be executed in a variety of different orders.

After mask data preparation 1832 and during mask fabrication 1844, a mask 1845 or a group of masks 1845 are fabricated based on the modified IC design layout diagram 1822. In some embodiments, mask fabrication 1844 includes performing one or more lithographic exposures based on IC design layout diagram 1822. In some embodiments, an electron-beam (e-beam) or a mechanism of multiple e-beams is used to form a pattern on a mask (photomask or reticle) 1845 based on the modified IC design layout diagram 1822. Mask 1845 can be formed in various technologies. In some embodiments, mask 1845 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1845 includes a transparent substrate (e.g., fused quartz) and an opaque material (e.g., chromium) coated in the opaque regions of the binary mask. In another example, mask 1845 is formed using a phase shift technology. In a phase shift mask (PSM) version of mask 1845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1844 is used in a variety of processes. For example, such a mask(s) is used in an ion implantation process to form various doped regions in semiconductor wafer 1853, in an etching process to form various etching regions in semiconductor wafer 1853, and/or in other suitable processes.

IC fab 1850 is an IC fabrication business that includes one or more manufacturing facilities for the fabrication of a variety of different IC products. In some embodiments, IC Fab 1850 is a semiconductor foundry. For example, there may be a manufacturing facility for the front-end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1850 includes wafer fabrication tools 1852 configured to execute various manufacturing operations on semiconductor wafer 1853 such that IC device 1860 is fabricated in accordance with the mask(s), e.g., mask 1845. In various embodiments, fabrication tools 1852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1850 uses mask(s) 1845 fabricated by mask house 1830 to fabricate IC device 1860. Thus, IC fab 1850 at least indirectly uses IC design layout diagram 1822 to fabricate IC device 1860. In some embodiments, semiconductor wafer 1853 is fabricated by IC fab 1850 using mask(s) 1845 to form IC device 1860. In some embodiments, the IC fabrication includes performing one or more lithographic exposures based at least indirectly on IC design layout diagram 1822. Semiconductor wafer 1853 includes a silicon substrate or other proper substrate having material layers formed thereon. Semiconductor wafer 1853 further includes one or more of various doped regions, dielectric features, multi-level interconnects, and the like (formed at subsequent manufacturing steps).

The present disclosure provides a semiconductor device. The semiconductor device includes a first scan flip-flop circuit, a second scan flip-flop circuit, a scan in path, and a snorkel structure. The first scan flip-flop circuit has an output terminal. The second scan flip-flop circuit has an input terminal. The scan in path is formed between the output terminal of the first scan flip-flop circuit and the input terminal of the second scan flip-flop circuit. The snorkel structure is connected to the scan in path. The snorkel structure is electrically connected to the output terminal of the first scan flip-flop circuit and the input terminal of the second scan flip-flop circuit. The second conductive structure has a topmost conductive layer buried in a dielectric layer of the semiconductor device.

The present disclosure provides a semiconductor device. The semiconductor device includes a first cell and a snorkel structure. The first cell has an output terminal. The output terminal has a first potential. The snorkel structure includes a first conductive structure, a first conductive layer, and a second conductive structure. The first conductive structure is electrically connected to the output terminal of the first cell. The first conductive layer is electrically connected to the first conductive structure. The second conductive structure is electrically connected to the first conductive layer. The second conductive structure includes a topmost conductive layer. The topmost conductive layer has a second potential substantially the same as the first potential. The topmost conductive layer is configured to receive a first e-beam signal.

The present disclosure provides a method of manufacturing a semiconductor device. The method includes fabricating transistors with a front-end-of-line processing. One of the transistors has a drain terminal connected to an output terminal of a scan flip-flop circuit. The method also includes forming a first conductive structure that is conductively connected to the output terminal, which includes fabricating a plurality of landing portions in multiple metal layers and fabricating a plurality of conductive vias in multiple layers of interlayer dielectric. Each of conductive vias is conductively connected between two of the landing portions. The method further includes fabricating a second conductive structure that is conductively connected to the output terminal of the scan flip-flop circuit through the first conductive structure. The second conductive structure has a topmost conductive layer configured to receive an e-beam signal.

The methods and features of the present disclosure have been sufficiently described by examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein may be utilized according to the present disclosure.

Accordingly, the appended claims are intended to include within their scope, processes, machines, manufacture, compositions of matter, means, methods or steps. In addition, each claim constitutes a separate embodiment, and the combination of various claims and embodiments are within the scope of the present disclosure.

What is claimed is:
1. A semiconductor device, comprising:
  a first scan flip-flop circuit (11) having an output terminal (111/Q);
  a second scan flip-flop circuit (15) having an input terminal (151/SI);
  a scan in path (SP) formed between the output terminal of the first scan flip-flop circuit and the input terminal of the second scan flip-flop circuit; and
  a snorkel structure (20) connected to the scan in path, wherein the snorkel structure is electrically connected to the output terminal (111/Q) of the first scan flip-flop circuit (11) and the input terminal of the second scan flip-flop circuit, and wherein a second conductive structure (23) has a topmost conductive layer (233) buried in a dielectric layer (10) of the semiconductor device.

2. The semiconductor device of claim 1, wherein the topmost conductive layer (23) has a first surface (2331) facing away from the first scan flip-flop circuit (11/14) and being covered by a portion of the dielectric layer.

3. The semiconductor device of claim 1, wherein the snorkel structure (20) includes a plurality of first via pillars.

4. The semiconductor device of claim 3, wherein the snorkel structure (20) includes a first conductive layer and, wherein the plurality of first via pillars of the first conductive structure has a first conductive via connected to the first conductive layer.

5. The semiconductor device of claim 4, wherein the snorkel structure (20) includes a plurality of second via pillars connected to the topmost conductive layer.

6. The semiconductor device of claim 5, wherein the plurality of second via pillars of the second conductive structure has a first conductive via pillar connected to the first conductive layer (22).

7. The semiconductor device of claim 1, wherein the snorkel structure (20) includes a through-silicon via connecting the output terminal of the first scan flip-flop circuit.

8. The semiconductor device of claim 6, wherein the first conductive layer (22) of the snorkel structure extends in a first direction (x), and the first via pillars and the second via pillars (23) extend in a second direction (z), wherein the first direction is substantially perpendicular to the second direction.

9. The semiconductor device of claim 1, further comprising a conductive layer (30) disposed on the snorkel structure, wherein the conductive layer is free from completely covering the topmost conductive layer (233) of the snorkel structure from a top view.

10. The semiconductor device of claim 9, wherein the topmost conductive layer (233) of the snorkel structure has an enclosure having a substantially rectangular shape (233a) from the top view.

11. The semiconductor device of claim 9, wherein the topmost conductive layer (233) of the snorkel structure is electrically isolated from the second conductive layer (30).

12. The semiconductor device of claim 8, wherein the output terminal (111/142) of the first scan flip-flop circuit is electrically connected to the input terminal (121) of the second scan flip-flop circuit through the first conductive layer (22) of the snorkel structure.

13. The semiconductor device of claim 12, further comprising a buffer in the scan in path, wherein the snorkel structure (20) is disposed between the first scan flip-flop circuit (11) and the buffer (14).

14. A semiconductor device, comprising:
a first cell (11/14) having an output terminal (111/142), wherein the output terminal has a first potential;
a snorkel structure (20) comprising:
a first conductive structure (21) electrically connected to the output terminal of the first cell;
a first conductive layer (22) electrically connected to the first conductive structure; and
a second conductive structure (23) electrically connected to the first conductive layer (22) and comprising a topmost conductive layer (233), wherein the topmost conductive layer (233) has a second potential substantially the same as the first potential, wherein the topmost conductive layer (233) is configured to receive a first e-beam signal.

15. The semiconductor device of claim 14, wherein the topmost conductive layer (233) is configured to receive the first e-beam signal and generate a second e-beam signal (B2) based on the second potential of the topmost conductive layer (233).

16. The semiconductor device of claim 15, wherein, if the second potential is high (1), the second e-beam signal (B2) has a first energy, and if the second potential is low (0), the second e-beam signal (B2) has a second energy, and wherein the first energy and the second energy are different.

17. The semiconductor device of claim 14, further comprising a second cell (12) having an input terminal (121) electrically connected to the output terminal (111/142) of the first cell through the first conductive layer (22) of the snorkel structure.

18. The semiconductor device of claim 14, further comprising a backside power delivery network (50) configured to provide a power to the semiconductor device.

19. A method comprising:
fabricating transistors with a front-end-of-line processing, wherein one of the transistors has a drain terminal connected to an output terminal of a scan flip-flop circuit;
forming a first conductive structure that is conductively connected to the output terminal, wherein forming the first conductive structure comprises fabricating a plurality of landing portions in multiple metal layers and fabricating a plurality of conductive vias in multiple layers of interlayer dielectric, and wherein each of the conductive vias of the plurality of conductive vias is conductively connected between two of the landing portions; and
fabricating a second conductive structure that is conductively connected to the output terminal of the scan flip-flop circuit through the first conductive structure, and wherein the second conductive structure has a topmost conductive layer configured to receive an e-beam signal.

20. The method of claim 19, wherein fabricating the plurality of landing portions comprises:
fabricating a landing portion in a selected metal layer with an etching process, and the etching process comprising removing metal materials in the selected metal layer surrounding the landing portion to isolate the landing portion from other conductive elements in the selected metal layer.

* * * * *